United States Patent
Nawaz et al.

(10) Patent No.: US 12,254,347 B2
(45) Date of Patent: Mar. 18, 2025

(54) DATA PIPELINE

(71) Applicant: Regeneron Pharmaceuticals, Inc., Tarrytown, NY (US)

(72) Inventors: Shah Nawaz, Tarrytown, NY (US); Quan Yang, Tarrytown, NY (US); Naveen Karumuri, Tarrytown, NY (US); Rajeshwar Gande, Tarrytown, NY (US); Cuie Hu, Tarrytown, NY (US); Srinivasan Sadanandhamurthy, Tarrytown, NY (US); Christian Buhay, Tarrytown, NY (US); Matthew Franklin, Tarrytown, NY (US); Abdul Shaik, Tarrytown, NY (US); Marco Hernandez, Tarrytown, NY (US); Siddhesh Salunke, Tarrytown, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 0 days.

(21) Appl. No.: 17/700,076

(22) Filed: Mar. 21, 2022

(65) Prior Publication Data

US 2022/0300321 A1  Sep. 22, 2022

Related U.S. Application Data

(60) Provisional application No. 63/163,904, filed on Mar. 19, 2021, provisional application No. 63/237,904, filed on Aug. 27, 2021.

(51) Int. Cl.
*G06F 9/48* (2006.01)
*G06F 9/54* (2006.01)

(52) U.S. Cl.
CPC .......... *G06F 9/4881* (2013.01); *G06F 9/541* (2013.01); *G06F 9/546* (2013.01)

(58) Field of Classification Search
CPC ...... G06F 9/4881; G06F 9/541; G06F 16/162; G06F 16/178; G06F 16/182; G06F 16/184; G06F 16/1858; G06T 17/00
See application file for complete search history.

(56) References Cited

U.S. PATENT DOCUMENTS

| | | | |
|---|---|---|---|
| 7,809,868 B1 | 10/2010 | Mu | |
| 2003/0159007 A1* | 8/2003 | Sawdon | G06F 3/065 714/E11.122 |

(Continued)

FOREIGN PATENT DOCUMENTS

| | | | | |
|---|---|---|---|---|
| CN | 104537713 A | * | 4/2015 | G06T 17/00 |
| CN | 112258627 A | * | 1/2021 | G06K 9/6267 |

(Continued)

OTHER PUBLICATIONS

Search Report and Written Opinion mailed on Jun. 9, 2022 by the International Searching Authority for Application No. PCT/US2022/021190, filed Mar. 31, 2022 (Applicant—Regeneron Pharmaceuticals, Inc.) (15 Pages).

(Continued)

*Primary Examiner* — Logan M Kraft
*Assistant Examiner* — Joshua Campbell
(74) *Attorney, Agent, or Firm* — Smith Baluch LLP

(57) ABSTRACT

A scalable cloud-based data processing and computing platform to support a large volume data pipeline.

17 Claims, 17 Drawing Sheets

(56) References Cited

U.S. PATENT DOCUMENTS

| | | | |
|---|---|---|---|
| 2004/0205152 A1* | 10/2004 | Yasuda | G06F 16/188 |
| | | | 709/217 |
| 2005/0235286 A1* | 10/2005 | Ballew | G06F 9/4881 |
| | | | 718/100 |
| 2011/0246429 A1* | 10/2011 | Prahlad | G06F 11/1471 |
| | | | 707/E17.007 |
| 2015/0381731 A1 | 12/2015 | Grube et al. | |
| 2018/0196817 A1* | 7/2018 | Maybee | G06F 3/0608 |
| 2019/0138555 A1* | 5/2019 | Bequet | H04L 67/10 |
| 2019/0156916 A1* | 5/2019 | Deng | C12Q 1/68 |

FOREIGN PATENT DOCUMENTS

| | | | | |
|---|---|---|---|---|
| CN | 113377733 A | * | 9/2021 | |
| CN | 113835869 A | * | 12/2021 | G06F 9/505 |
| EP | 3553714 A1 | * | 10/2019 | G06Q 10/06 |
| JP | 09282359 A | * | 10/1997 | |
| WO | WO-2019068201 A1 | * | 4/2019 | G01N 23/2251 |

OTHER PUBLICATIONS

Office Action in European App. No. 22715864.9 dated Oct. 7, 2024, 9 pages.

* cited by examiner

FIG. 6A

```
DATASET MANAGEMENT UTILITY 501

#! Listing Keys from s3://datastore-01/TestData/
TestData/Anable_Data/
TestData/cisTem_test_dir/
TestData/relion_test_dir/
TestData/ser-test-data/

#! Listing Keys from s3://datastore-01/krios_data/
krios_data/.aws-datasync/
krios_data/18Dec2019/
krios_data/20200114_apoferritin/
krios_data/20200114_apoferritin_bkp/
krios_data/20200114_gain_reference/
krios_data/20200115_C5-R3946_!TY-gp130-IL-R-IL6_screening/
```

| LOAD DATASET 604 | REFRESH DATASET 603 | PREV. DIRECTORY 602 |

FIG. 6B

DATASET MANAGEMENT UTILITY 501

SELECT FSX-LUSTRE SIZE(GB)
7200

—610

PROCEED 605

CANCEL 606

| TASK | TEMPLATE NAME | MPI # | THREAD # | COMPUTE NODE # |
|---|---|---|---|---|
| TASK 1 | TEMPLATE 1 | 64 | - | 1 |
| TASK 2 | TEMPLATE 2 | 128 | 2 | 4 |
| TASK 3 | TEMPLATE 3 | 8 | 8 | 1 |

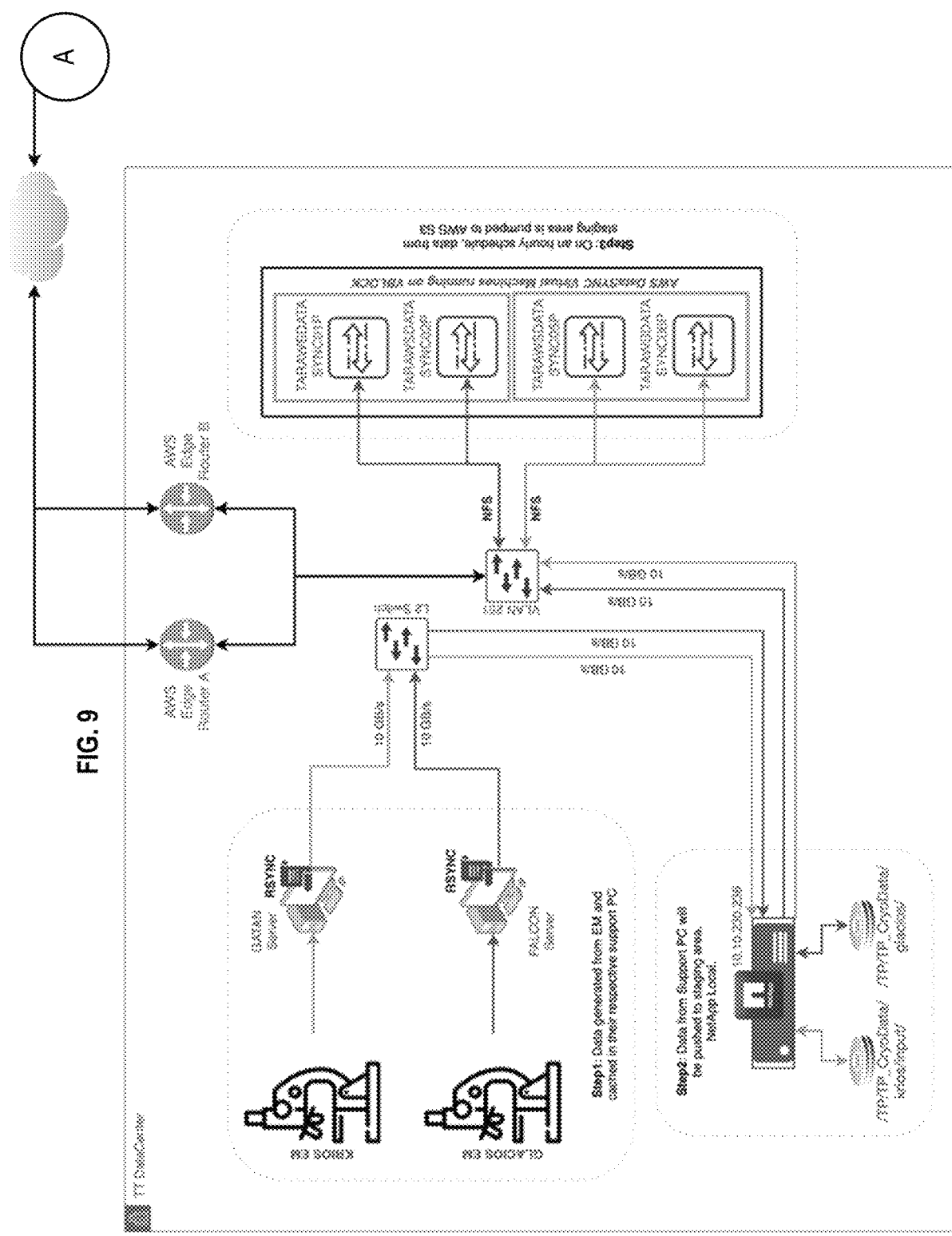

┌─ 1510
RECEIVE AN INDICATION OF A SYNCHRONIZATION REQUEST

┌─ 1520
DETERMINE, BASED ON THE INDICATION, ONE OR MORE FILES STORED IN A STAGING LOCATION

┌─ 1530
GENERATE, BASED ON THE ONE OR MORE FILES, A DATA TRANSFER FILTER

┌─ 1540
CAUSE, BASED ON THE DATA TRANSFER FILTER, TRANSFER OF THE ONE OR MORE FILES TO OBJECT STORAGE OF A DESTINATION COMPUTING DEVICE

┌─ 1550
RECEIVE, VIA A GRAPHICAL USER INTERFACE, A REQUEST TO CONVERT THE ONE OR MORE FILES FROM OBJECT STORAGE TO A DISTRIBUTED FILE SYSTEM

┌─ 1560
RECEIVE, VIA THE GRAPHICAL USER INTERFACE, AN INDICATION OF A STORAGE SIZE OF THE DISTRIBUTED FILE SYSTEM

┌─ 1570
CONVERT, BASED ON THE REQUEST AND THE INDICATION, THE ONE OR MORE FILES FROM OBJECT STORAGE TO THE DISTRIBUTED FILE SYSTEM ASSOCIATED WITH THE STORAGE SIZE

┌─ 1580
IDENTIFY A DATA ANALYSIS APPLICATION PROGRAM ASSOCIATED WITH THE ONE OR MORE FILES IN THE DISTRIBUTED FILE SYSTEM

┌─ 1590
DETERMINE, AS A PROGRAM TEMPLATE, ONE OR MORE JOB PARAMETERS ASSOCIATED WITH THE DATA ANALYSIS APPLICATION PROGRAM PROCESSING THE DATASET

┌─ 1595
CAUSE, BASED ON THE PROGRAM TEMPLATE, EXECUTION OF THE DATA ANALYSIS APPLICATION PROGRAM THE ONE OR MORE FILES IN THE DISTRIBUTED FILE SYSTEM

DATA PIPELINE

CROSS-REFERENCE TO RELATED PATENT APPLICATIONS

This application claims the benefit of and priority to U.S. Provisional Patent Application No. 63/163,690, filed on Mar. 19, 2021, and U.S. Provisional Patent Application No. 63/237,904, filed on Aug. 27, 2021. The entire contents of the afore-captioned applications are hereby incorporated by reference herein.

BACKGROUND

Currently, cloud computing services are provided globally to millions of users and customers who reside in different locations (e.g., countries, continents, etc.). Various entities provide private or public cloud computing services globally to different customers over various sectors for critical and non-critical applications. These entities provide various cloud computing services including, for example, software-as-a-service (SaaS), infrastructure-as-a-service (IaaS), and/or platform-as-a-service (PaaS). In order to utilize such cloud computing services, users must transfer locally generated data to the cloud. However, research experiments generate incredible amounts of data and uploading such data to a cloud computing service takes an unsatisfactory amount of time and slows down research. For example, cryo-electron microscopy (cryo-EM) reveals the structure of proteins by probing a flash-frozen solution with a beam of electrons, and then combining two-dimensional (2D) images of individual molecules into a three-dimensional (3D) picture. Cryo-EMs are powerful scientific instruments, and they produce enormous amount of data in the form of 2D pictures of the proteins at high resolutions. Scientists have to perform a series of computations that requires a large amount of computing power to convert the 2D images into useful 3D models. Such a task takes weeks of time on a regular workstation or computer clusters with finite capacities. Excess upload times associated with utilizing a cloud computing service for model generation further exacerbates the time required to generate the 3D models, slowing down research.

SUMMARY

The methods and systems disclosed, individually or in combination, provide a scalable cloud-based data processing and computing platform to support large volume data pipeline.

In an embodiments, the disclosure provides a method. The method comprises receiving an indication of a synchronization request. The method further comprises determining, based on the indication, one or more files stored in a staging location. The method further comprises generating, based on the one or more files, a data transfer filter. The method further comprises causing, based on the data transfer filter, transfer of the one or more files to a destination computing device.

In an embodiment, the disclosure provides a method. The method comprises receiving, via a graphical user interface, a request to convert a dataset from object storage to a distributed file system. The method further comprises receiving, via the graphical user interface, an indication of a storage size of the distributed file system. The method further comprises converting, based on the request and the indication, the dataset from object storage to the distributed file system associated with the storage size.

In an embodiment, the disclosure provides a method. The method comprises identifying a data analysis application program. The method further comprises identifying a dataset associated with the data analysis application program. The method further comprises determining, as a program template, one or more job parameters associated with the data analysis application program processing the dataset. The method further comprises causing, based on the program template, execution of the data analysis application program on the dataset.

In an embodiment, the disclosure provides a method. The method comprises receiving an indication of a synchronization request. The method further comprises determining, based on the indication, one or more files stored in a staging location. The method further comprises generating, based on the one or more files, a data transfer filter. The method further comprises causing, based on the data transfer filter, transfer of the one or more files to object storage of a destination computing device. The method further comprises receiving, via a graphical user interface, a request to convert the one or more files from object storage to a distributed file system. The method further comprises receiving, via the graphical user interface, an indication of a storage size of the distributed file system. The method further comprises converting, based on the request and the indication, the one or more files from object storage to the distributed file system associated with the storage size. The method further comprises identifying a data analysis application program associated with the one or more files in the distributed file system. The method further comprises determining, as a program template, one or more job parameters associated with the data analysis application program processing the dataset. The method further comprises causing, based on the program template, execution of the data analysis application program the one or more files in the distributed file system.

Additional advantages of the disclosed method and compositions will be set forth in part in the description which follows, and in part will be understood from the description, or may be learned by practice of the disclosed method and compositions. The advantages of the disclosed method and compositions will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed method and compositions and together with the description, serve to explain the principles of the disclosed methods and systems:

FIG. 6A shows an example graphical user interface;
FIG. 6B shows an example graphical user interface.

FIG. 9 shows an example operating environment;
FIG. 15 shows an example method.

DETAILED DESCRIPTION

Figure 1:
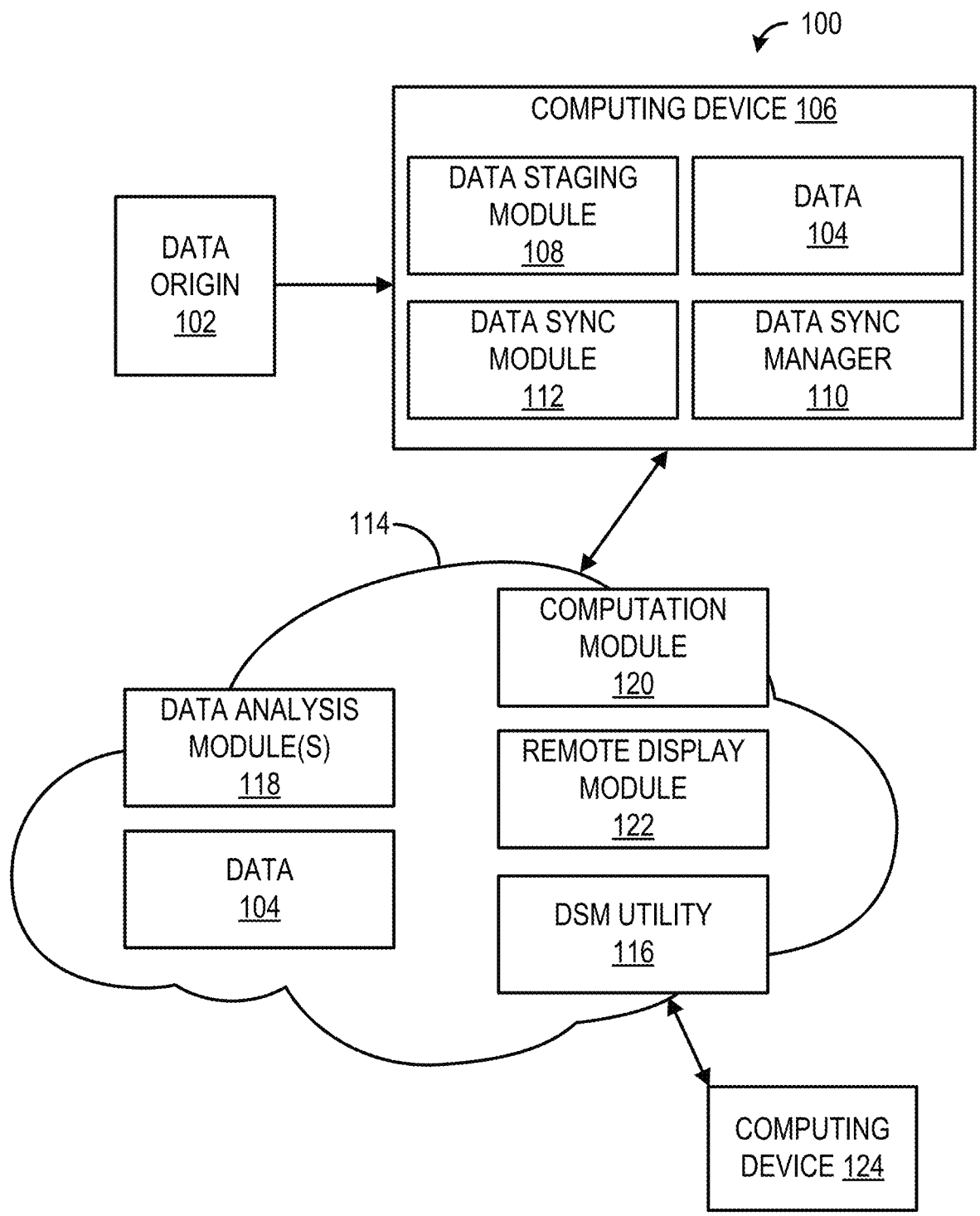
FIG. 1 shows an example operating environment.

The disclosed methods and systems may be understood more readily by reference to the following detailed description of particular embodiments and the Example included therein and to the Figures and their previous and following description.

It is understood that the disclosed method and systems are not limited to the particular methodology, protocols, and reagents described as these may vary. It is also to be understood that the terminology used herein is for the purpose of describing particular embodiments only, and is not intended to limit the scope of the present invention which will be limited only by the appended claims.

It must be noted that as used herein and in the appended claims, the singular forms "a.", "an." and "the" include plural reference unless the context clearly dictates otherwise. Thus, for example, reference to "an image" includes a plurality of images, and so forth.

"Optional" or "optionally" means that the subsequently described event, circumstance, or material may or may not occur or be present, and that the description includes instances where the event, circumstance, or material occurs or is present and instances where it does not occur or is not present.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

"Exemplary" means "an example of" and is not intended to convey an indication of a preferred or ideal configuration. "Such as" is not used in a restrictive sense, but for explanatory purposes.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

The disclosed technologies can be used on a wide range of macromolecules, including, but not limited to, proteins, peptides, nucleic acids and polymers. In some aspects, a protein can be an antibody or fragment thereof.

Once the disclosed technology has been used to determine the structure of a macromolecule, such as an antibody, the macromolecule can then be used in methods of treating, detecting, or diagnosing. For example, an antibody identified using the disclosed technology can be administered to a subject to treat a disease, disorder, and/or condition of interest. In some aspects, a disease, disorder, and/or condition of interest can be cancer, viral infection (e.g., coronavirus, influenza virus), or inflammatory disorder (e.g. rheumatoid arthritis, lupus).

Various techniques can be used to attempt to determine 3D structures of proteins, viruses, and other molecules from images thereof. Once images of a target molecule are collected, determination of a 3D structure of the molecule requires the successful completion of a difficult reconstruction of the 3D structure from the images. The computational demands to process the quantity of 2D images and subsequent generation of the 3D structure are extreme and can easily result in many terabytes of data being generated per day.

To fully deliver on the promise of cryo-EM technology, researchers need timely access to both data and computational power over the network. Researchers need an information technology (IT) infrastructure that can handle the data growth as well as enormous demand on computing in the cloud using highly specialized packages for the image-processing after the images are captured. Processing data/images coming from a cryo-EM microscope demands scalable storage for large datasets (median size per sample 1.2 TB, for example), a fastest CPU/GPU enabled hybrid environment for performing computations pertaining to larger datasets, and a high-speed network to move the data from the instrument to the cloud. To tackle the storage, computational power, and cost of operations, the present disclosure provides a High Performance Computing (HPC) platform on the cloud. The methods and systems disclosed can provide end results (such as 3D models) in significantly shorter times than state of the art systems.

In light of the data growth and pace, various considerations may be taken into account and components re-architected to provide a best possible infrastructure to deal with cryo-EM needs. Increased data transfer speed provides elasticity to handle growing needs, minimizing unresolvable bottlenecks, and makes data available for process in least amount time (for example, less than one hour to two hours for each dataset). Storage optimization (for example, implemented using FSx Lustre (Tier 1) and S3 (Tier 2)) may enable unlimited storage capacities and at the same time keep operational cost low, provide a long-term storage for raw data, and provide a filesystem with very high parallelism to sustain heavy I/Os (or throughput). Compute optimization may be adjusted based on assessment of workload usage patterns. Software optimization may permit job-based submission script optimization to spawn through an entire resource and result in faster completion of jobs with less computation power. A self-service storage management utility may enable users to manage the datasets being analyzed. For example, instead of creating one larger file system, a distributed file system (DFS) and/or parallel file system may be generated per dataset being analyzed. Such a distributed/parallel file system may reduce storage capacities and/or cost.

Disclosed are methods for efficient, high-speed, big data transfer that may support one or more data processing applications. For example, a data processing application that may be supported by the efficient, high-speed, big data transfer techniques disclosed herein includes 3D structure estimation from 2D electron cryo-microscopy images.

As shown in FIG. 1, a system 100 can comprise a data origin 102. The data origin 102 can be any type of data generating system, for example, an imaging system, a genetic sequencing system, combinations thereof, and the like. The data origin 102 may comprise, in an embodiment, one or more components that supply data. The component(s) may expose the data in numerous ways, according to one or several mechanism. For example, the component(s) may be embodied in, or may constitute, a computing device comprising one or several types of data storage. Thus, the data origin 102 may comprise a network file system (NFS), a server message block (SMB), a Hadoop Distributed File System (HDFS), and/or an on-premises object store.

In an embodiment, the data origin 102 may comprise an imaging system made up of one or more electron microscopes (e.g., cryogenic electron microscopy (Cryo-EM)). Cryo-EM is a computer vision-based approach to 3D macromolecular structure determination. Cryo-EM is applicable to medium-sized to large-sized molecules in their native state. This scope of applicability is in sharp contrast to X-ray crystallography, which requires a crystal of the target molecule, which crystal is often difficult (if not plain unfeasible) to grow. Such a scope also is in sharp contrast to nuclear magnetic resonance (NMR) spectroscopy, which is limited to relatively small molecules. Cryo-EM has the potential to unveil the molecular and chemical nature of fundamental biology through the discovery of atomic structures of previously unknown biological structures. Many of such atomic structures have proven difficult or impossible to study by conventional structural biology techniques.

In Cryo-EM, a purified solution of a target molecule is first cryogenically frozen into a thin (single molecule thick) film on a carbon grid, and then the resulting grid is imaged with a transmission electron microscope. The grid is exposed to a low-dose electron beam inside the microscope column, and 2D projections of the sample are collected using a camera (film, charge-coupled device (CCD) sensor, direct electron detector, or similar) at the base of the column. A large number of such projections are obtained, each of which provides a micrograph containing hundreds of visible, individual molecules. In a process known as particle picking, individual molecules are selected from the micrographs, resulting in a stack of cropped images of the molecule (referred to as "particle images"). Each particle image provides a noisy view of the molecule with an unknown pose. Once a large set of 2D electron microscope particle images of the molecule have been obtained, reconstruction can be carried out to estimate the 3D density of a target molecule from the images.

In Cryo-EM, often millions of 2D particle images of a sample, consisting of hundreds to thousands of copies of a single protein molecule or protein-drug complex (known as a "target"), are captured in an electron microscope. The particle images can then be computationally assembled to reconstruct and refine a 3D model of the target to a desired resolution. Notably, the number of images, level of detail, and level of noise in each image are significantly beyond what a human could reasonably comprehend by examining the images, or mentally or otherwise attempting to interpret the images. In other words, the richness and complexity of the imaging data contained in the particle images readily precludes the human mind to reconstruct and refine a 3D model of that target. In most cases, it is not until all or most of the images (potentially on the order of millions) and their corresponding viewing directions are simultaneously aggregated in the abstract form of complex-number values coefficients of a Fourier series expansion arranged in a 3D grid, that the information contained in the images becomes interpretable by the embodiments described herein. The embodiments described herein generally use approaches and symbols which would be virtually impossible to implement without the use of a computing device; and it is therefore only the clever use of such computing device, as described herein, which allows the approaches, methods and processes described herein to be practically and concretely undertaken.

Generally, the usefulness of a particular Cryo-EM reconstruction for a given target depends on the resolution that is achievable on that target. A high-resolution reconstruction can resolve fine detail including, in a particularly good case, atomic positions to be interpreted from the reconstruction. In contrast, a low-resolution reconstruction may only depict large, globular features of a protein molecule rather than fine detail; thus, making it difficult to use the reconstruction in further chemistry or biological research pipelines.

Particularly for drug development pipelines, high resolution reconstructions of a target can be substantially advantageous. As an example, such high resolution reconstructions can yield extremely valuable insight into whether the target is well-suited for the application of a therapeutic (such as a drug). As another example, high resolution reconstructions can be used to understand the types of drug candidates that may be suitable for the target. As another example, in cases where the target is actually a compound of a protein and a particular drug candidate, high resolution reconstructions can even illuminate possible ways to optimize a drug candidate to improve its binding affinity and reduce off-target binding; thereby reducing the potential for unwanted side effects. Thus, with Cryo-EM reconstructions, approaches that can improve the resolution of a computationally reconstructed 3D result are of high scientific and commercial value.

Resolution in the context of Cryo-EM is generally measured and described in terms of a shortest resolvable wavelength of a 3D structural signal in a final 3D structure output of a structure refinement technique. In some cases, the shortest resolvable wavelength has a resolution being the shortest wavelength that has correct, validate-able signal. The wavelength is typically stated in units of Angstroms (Å; a tenth of a nanometer). Smaller values for the wavelength indicate a higher resolution.

As an example, a very high resolution Cryo-EM structure can have a resolution of approximately 2 Å, a medium resolution can have approximately 4 Å, and a low resolution can be in the range of about 8 Å or worse. Alongside numerical resolution, interpretability and usefulness of a Cryo-EM reconstruction can depend on the quality of the 3D density map that is reconstructed and whether or not a qualified user can examine the 3D density map with their naked eye to identify critical features of the protein molecule; for example, backbone, side-chains, bound ligands, or the like. The ability of the user to identify these features with accuracy is highly dependent on the resolution quality of the 3D density map.

Accordingly, the data origin 102 may be configured to generate data 104. The data 104 may comprise image data, such as image data defining 2D electron cryo-microscopy images, also referred to as particle images. The data 104 may comprise sequence data, in some cases.

A computing device 106 may be in communication with the data origin 102. The computing device 106 may be, for example, a smartphone, a tablet, a laptop computer, a desktop computer, a server computer, or the like. The computing device 106 may include a group of one or more server devices. The computing device 106 may be configured to generate, store, maintain, and/or update various data structures including a database for storage of the data 104. The computing device 106 may be configured to operate one or more application programs, such as a data staging module 108, a data sync manager 110, and/or a data sync module 112. The data staging module 108, the data sync manager 110, and/or the data sync module 112 may be stored and or configured to operate on the same computing device 106 or separately on separate computing devices.

In an embodiment, the computing device 106 may be configured, via the data staging module 108, to collect, retrieve, and/or receive the data 104 from the data origin 102 for storage in a storage system on the computing device 106 (or in a storage system functionally coupled to the computing device 106). The storage system may comprise one or multiple memory devices, and may be referred to as a staging location. The data staging module 108 may manage data stored in the storage system until such data is transferred out of that staging location. Once data has been transferred out of the staging location, the data staging module 108 may delete such data. The data staging module 108 may be configured to receive the data 104 through a variety of mechanisms. In an embodiment, the staging location may be treated as a remote directory for the data origin 102 such that data 104 generated by the data origin 102 is saved directly into the staging location. In addition, or in another embodiment, the data staging module 108 may be configured to monitor one or more network storage locations to detect new data 104, upon identifying new data 104 in a network storage location, the data staging module 108 may transfer the new data 104 to the staging location. Further, or in yet another embodiment, the data staging module 108 may be configured to permit a user to manually upload data to the staging location.

The computing device 106 may be configured, via the data sync manager 110 and the data sync module 112, to transfer the data 104 from the staging location to a cloud platform 114. In an embodiment, the computing device 106 may be configured, via the data sync manager 110 and the data sync module 112, to transfer the data 104 as the data 104 is received from the data origin 102. As disclosed, the system 100 represents an automated, end-to-end processing pipeline that enables the transport and processing of more than 1 TB/hour of raw data. In an embodiment, the data 104 may be transferred in near real-time as the data 104 is acquired.

In an embodiment, the data sync module 112 may be a data synchronization application program configured to transport the data 104 to the cloud platform 114. The data synchronization application program may be any data synchronization program, including, for example, AWS DataSync. AWS DataSync is a native AWS service configured to transport large amounts of data between on-premises storage and Amazon native storage services. In one example, the on-premises storage can be the staging location present in the computing device 106 or functionally coupled thereto. However, as data synchronization application programs are "sync" utilities, such application programs do not function as a unidirectional copy utility. In the case of AWS DataSync, AWS DataSync executes four phases to transfer data: launching, preparing, transferring, and verifying. Notably, in the preparing phase, AWS DataSync examines the source (e.g., the computing device 106) and destination (e.g., the cloud platform 114) file systems to determine which files to sync. AWS DataSync does so by recursively scanning the contents and metadata of files on the source and destination file systems for differences. The time that AWS DataSync spends in the preparing phase depends on the number of files in both the source and destination file systems and for large data transfers can take several hours. As the size of the data 104 stored at either source or destination, or both, grows, the time AWS DataSync spends in the preparing phase increases. Currently, with an example data size of 500 TB on the destination (e.g., the cloud platform 114), the preparing phase takes upwards of 2 hours. Only after the scanning is done and the differences are determined, does AWS DataSync transition to the transferring phase and transfer files and metadata from the source file system to the destination by copying changes to files with contents or metadata that are different between the source and the destination.

As described herein, the data origin 102 generates an extremely large amount of data 104. This extremely large amount of data needs to be made available on high-performance computing platforms, such as the cloud platform 114, as quickly as possible. Making the data 104 available faster provides a lead time for scientist to process and achieve results quicker, directly impacting drug discovery timing. The present state of existing data synchronization application programs greatly increases the time needed to transfer such data to high-performance computing platforms because of the time spent in scanning local and remote file systems prior to data transfer.

Figure 2A:
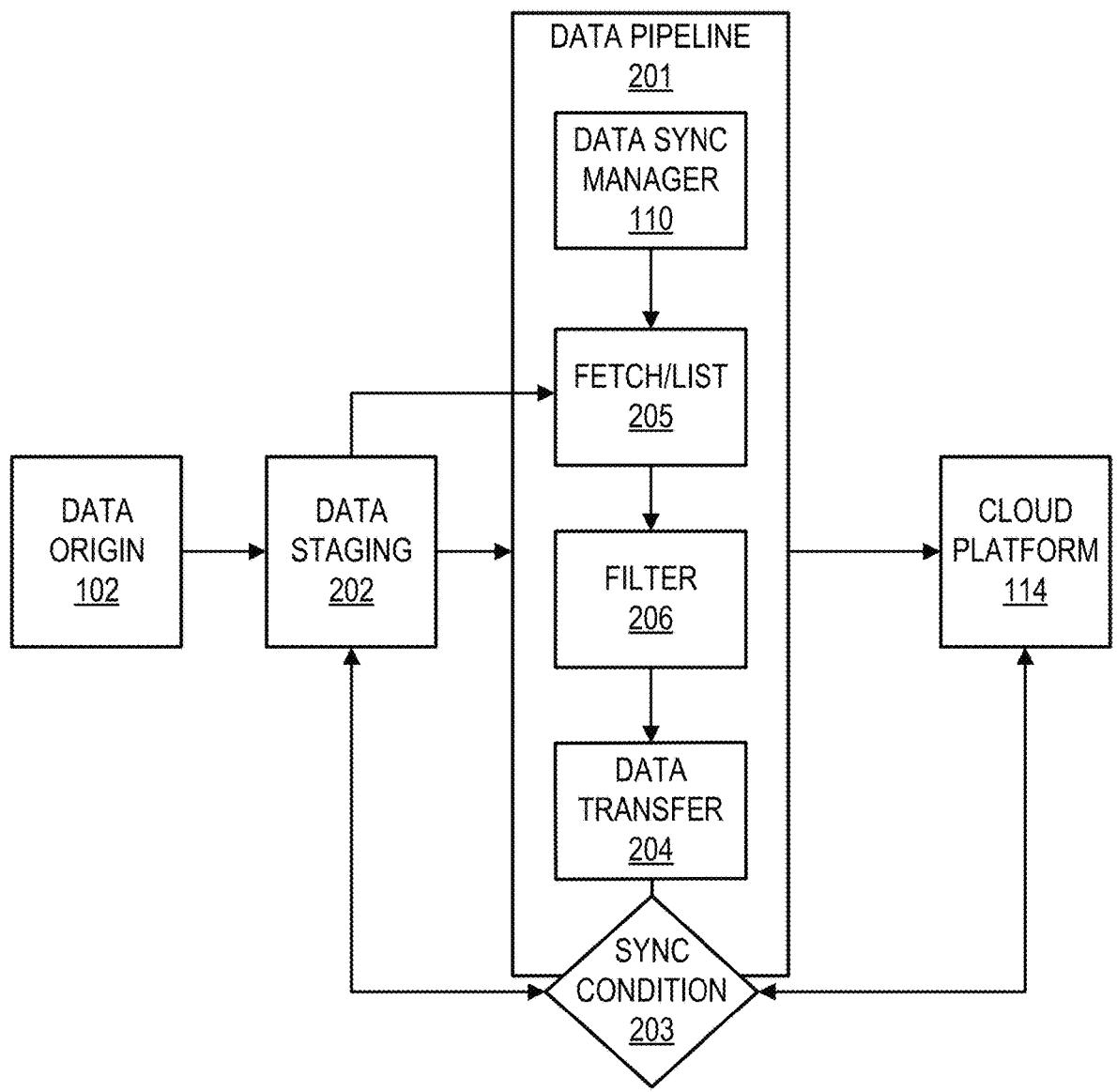
FIG. 2A shows an example data pipeline.

The system 100 is configured to implement an improved data pipeline 201 as shown in FIG. 2 that addresses the technological deficiencies of data synchronization application programs. The data pipeline 201 may comprise a multi-stage data transfer process to push the data 104 from the staging location on the computing device 106 (e.g., on-premises) to the cloud system 114. As described herein, the data 104 may be generated by the data origin 102. As part of a data staging process 202, the data 104 may be stored at the staging location by the data staging module 108. The purpose of the data staging process 202 is to hold the data 104 and maintain the data 104 ready for transmission. The data 104 in the staging location may be deleted once the data 104 is moved to the data destination (e.g., the cloud platform 114). A sync condition 203 dictates when a data transfer process 204 may be initiated. Thus, satisfying the sync condition 203 may cause initiation of the data transfer process 204. In one example scenario, the data transfer process 204 is initiated periodically, at a rate defined by a time interval that may be configurable. Thus, the sync condition 203 dictates that elapsed time since last data transfer must be equal to the time interval. However, prior to the execution of the data transfer process 204, the data sync manager 110 may be configured to determine the data 104 (e.g., identify files and/or directories) currently available at the staging location. To that end, for example, the data sync manager 110 may fetch a list 205 of the data 104 currently available at the staging location. In an embodiment, the data sync manager 110 may connect to the staging location and/or to any respective mount point/disk-volumes. The data sync manager 110 may then execute a list command to fetch a list of available files. The data sync manager 110 may be configured to utilize naming conventions when fetching a list of available files. For example, a scientific instrument may be configured to produce data with a defined naming convention. The data sync manager 110 may utilize Regular Expressions (RegEx) to include (or exclude) one or more files in the list. In an embodiment, the data sync manager 110 may also rely on RegEx to validate the directories and/or files for inclusion on the list.

The data sync manager 110 may be configured to use the list to generate a filter 206. The filter may comprise one or more of, a file name, a file location, a file extension, a file size, a checksum, a created date, a modified date, combinations thereof, and the like. Generating the filter 206 may comprise generating a message that invokes a function call to a cloud service (e.g., AWS DataSync), where the message passes the list of available files as an argument of the function call. The function call can initiate a task (or job) of the cloud service. The function call can be invoked according to an API implemented by the data storage service. The cloud service can be provided by one or more components of the cloud platform 114. The filter may be generated dynamically in that the filter may be generated at each iteration of the data transfer process 204. In an embodiment, the filter may include a reference to a partial file (e.g., a file that is not yet complete or is in the process of transfer to the staging location). In the event the filter includes a partial file, the partial file will be transferred and, in a subsequent iteration, the filter will include the full file and update the transferred partial file.

The data sync manager 110 then triggers the data transfer process 204 according to the filter 206. The filter 206 causes the data transfer process 204 to transfer only those files and/or directories specified by the filter 206. The filter 206 thus represents the data 104 that is only present at the staging location. The data pipeline 201 represents an improvement in computer technology as the standard data transfer process would compare data that is available at the staging location and the cloud platform 114, determine all new and changed/updated files to transfer, and push the data to the cloud platform 114, resulting in significantly increased time to complete the data transfer process. Whereas the present dynamically generated filter causes the data transfer process 204 to scan only a limited set of data at the staging location and at the cloud platform 114 which significantly reduces the time required for completing the data transfer process 204. In the example of AWS DataSync, the filter 206 causes the prepare phase of the AWS DataSync task to only scan the files specified in the filter instead of all files, thus minimizing the prepare phase time.

Figure 2B:
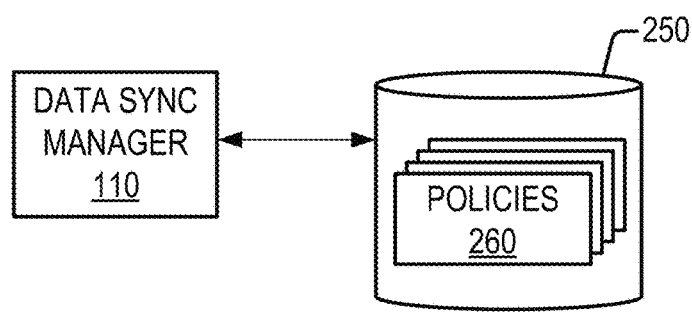
FIG. 2B shows an example operating environment.

In some embodiments, various synchronization policies can be generated and/or applied to determine data that is synchronized and data that is not synchronized. Synchronization polices may specify files to be synchronized based on selected criteria including data type, metadata, and location information (e.g., electron microscopy equipment that generated that data). As is shown in FIG. 2B, synchronization policies can be retained in one or more memory devices 250 (referred to as datastore 250) within one or more data structures 260 (referred to as policies 260). The datastore 250 can be integrated into the computing device 106 or can be functionally coupled thereto. In some cases, the datastore 250 can be part of the staging location. Synchronization policies can dictate the manner of generating the filter 206. In one example scenario, a scientist can flag particular data to not be synchronized, even though the data is present in the staging location. A synchronization policy may dictate that data flagged in such a manner is to not be synchronized. As a result, the data sync manager 110 may be configured to use a list of one or more files and such a synchronization policy in order to generate an instance of the filter 206. Accordingly, that instance of the filter may be updated to include one or more flags (which may be referred to as exclusion flags) associated with respective files. Due to the exclusion flag(s), such file(s) are excluded from synchronization. Another synchronization policy can dictate the time-to-live period of an exclusion flag, where the time-to-live period defines a time interval during which the exclusion flag is active. The TTL period causes data to be synchronized at some point in time, which avoids unnecessarily withholding data in the staging location.

Other types of flags or metadata can be defined to control the manner in which an instance of the filter 206 is generated and applied in data synchronization. Some flags may automatically expire after a full dataset is loaded to the staging location to avoid partial synchronization, for example.

Figure 3:
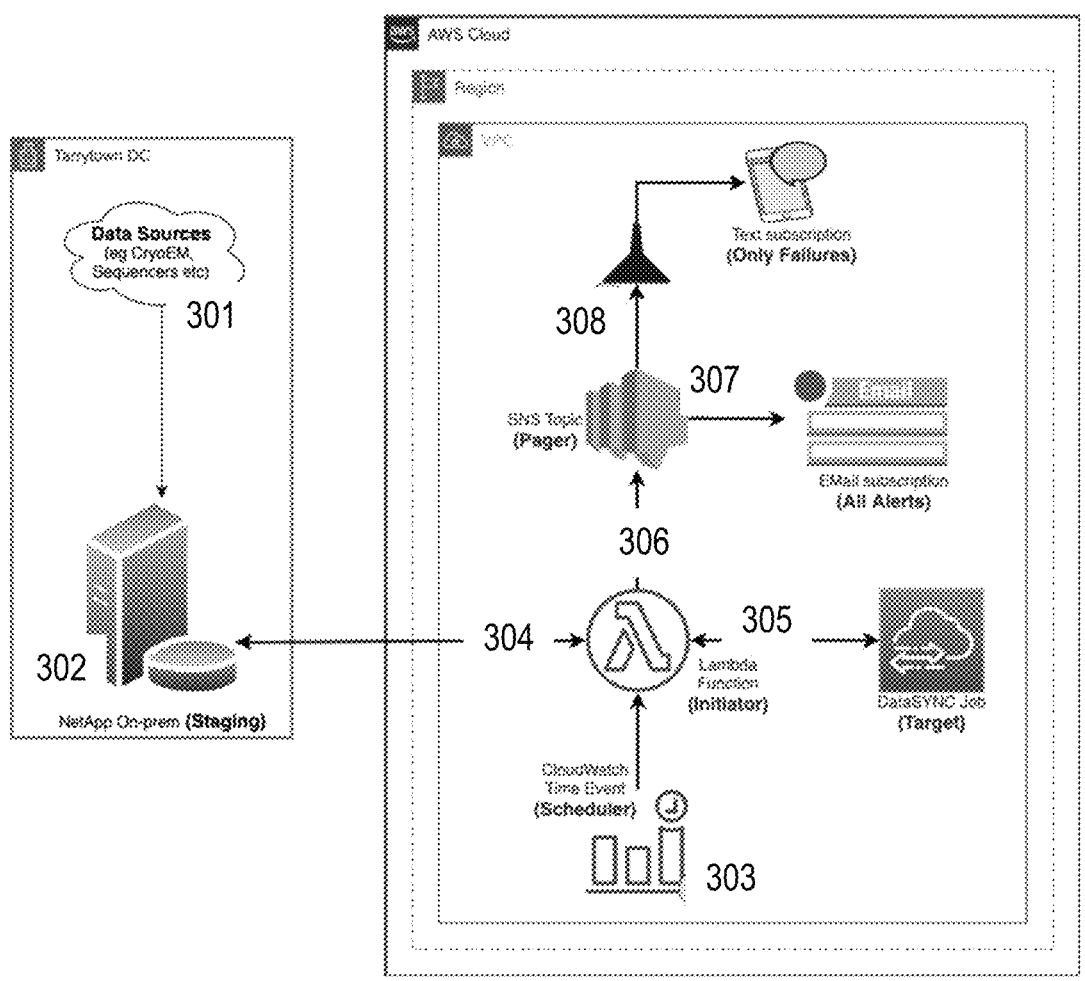
FIG. 3 shows an example operating environment.

FIG. 3 shows an example AWS architecture for implementing the data pipeline 201 of FIG. 2. Data is generated at data centers/laboratories at 301. Generated data may be staged in NetApp storage located in a local datacenter at 302. An AWS Cloud watch rule is configured to trigger a lambda function at regular intervals (e.g., periodically, at a configurable rate or time interval) depending on the agreed SLA at 303. An invoked Lambda function may connect to the on-premises NetApp storage via NFS to fetch a list of files available at 304. Once the file list is available, the Lambda function may filter out valid datasets (based on the naming convention) and are passed as a filter to the triggered DataSYNC job at 305. Lambda environment variable will hold the DataSYNC job ID, which it has to trigger. Out of the Lambda execution (success/failure) will be passed to SNS topic at 306. Lambda environment variable will hold the SNS topic ARN. All success or failure messages will be sent to subscribed emails at 307. SNS subscription has a message attribute filter setup, and this will pick up and Failures and additionally sends a text to admins at 308. Any failures will be notified instantaneously to admins via text to react quicker. The example AWS architecture in FIG. 3 greatly reduces the prepare phase timing as shown in Table 1. Making the data available for compute as quickly as possible is a key factor for faster drug discovery and analysis. With the improved data pipeline provides by the embodiments of this disclosure, data is available at compute significantly faster. In some cases, speedup factor of about 4 can be achieved.

TABLE 1

| Solution | Data Transferred | Task Duration | Per TB time |
| --- | --- | --- | --- |
| DataSYNC Pipeline | 1.25 TB | 3 Hrs, 04 Mins | 146 Mins |
| Enhanced DataSYNC Pipeline | 1.22 TB | 41 Mins, 33 Secs | 34 Mins |

The data 104 received by the cloud platform 114 may be stored in one or more types of storage (e.g., file systems). The cloud platform 114 may comprise a distributed parallel file system (e.g., Lustre) and/or an object based file system. In an embodiment, the data 104 received by the cloud platform 114 may be stored in the distributed parallel file system or the object based file system. In an embodiment, the data 104 received by the cloud platform 114 is initially stored in the object based file system and moved to the distributed parallel file system when the data 104 is to be processed (e.g., analyzed).

A file system is a subsystem that an operating system or program uses to organize and keep track of files. File systems may be organized in different ways. For example, a hierarchical file system is one that uses directories to organize files into a tree structure. File systems provide the ability to search for one or more files stored within the file system. Often this is performed using a "directory" scan or search. In some operating systems, the search can include file versions, file names, and/or file extensions.

Although an operating system provides its own file management system, third party file systems may be developed. These systems can interact smoothly with the operating system but provide more features, such as encryption, compression, file versioning, improved backup procedures, and stricter file protection. Some file systems are implemented over networks. Two common systems include the Network File System (NFS) and the Server Message Block (SMB, now CFIS) system. A file system implemented over a network takes a request from the operating system, converts the request into a network packet, transmits the packet to a remote server, and then processes the response. Other file systems are implemented as downloadable file systems, where the file system is packaged and delivered as a unit to the user.

File systems share an abstracted interface upon which the user may perform operations. These operations include, but are not limited to: Mount/Unmount, Directory scan, Open (Create)/Close, Read/Write, Status, and the like. The steps of associating a file system with an operating system (e.g. making the Virtual Layer binding of the file system to the operating system) are collectively called "mounting." In common usage, a newly mounted file system is associated with a specific location in a hierarchical file tree. All requests to that portion of the file tree are passed to the mounted file system. Different operating systems impose restrictions on the number and how deeply nested file system mounts can be. Un-mounting is the converse of mounting: a file system is disassociated from the operating system.

Figure 4A:
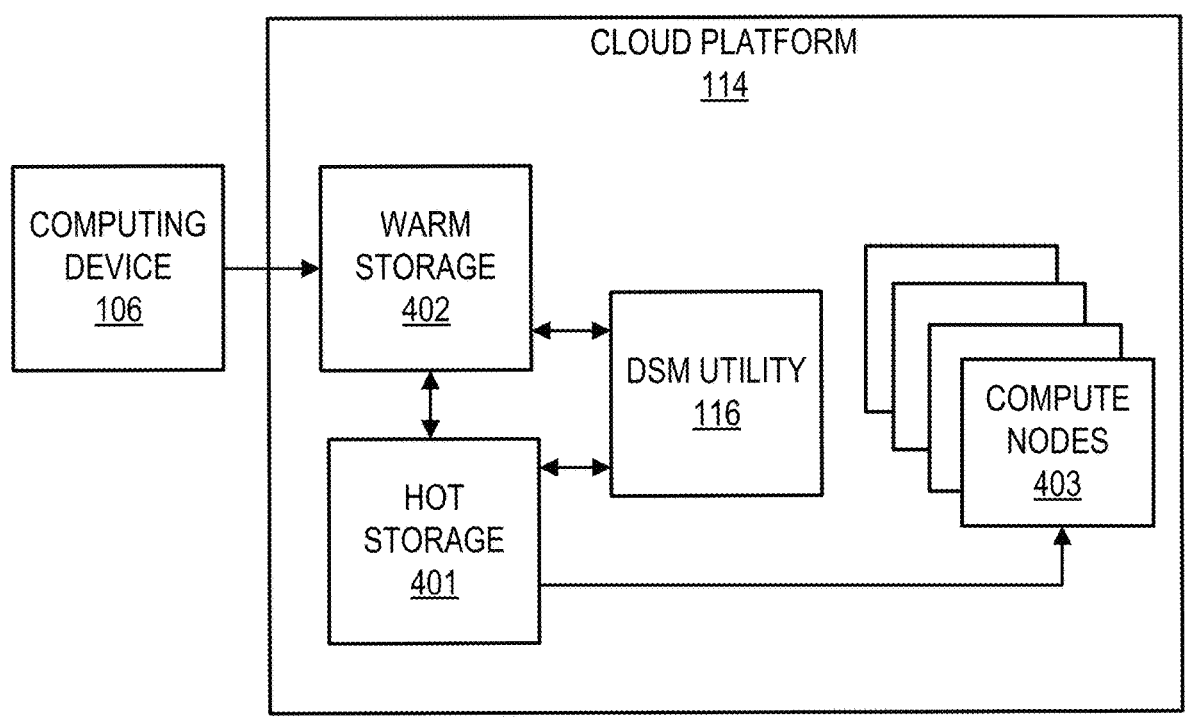
FIG. 4A shows an example operating environment.

As shown in FIG. 4, in an embodiment, analysis of the data 104 may be performed on a distributed computation and storage architecture, such as the cloud platform 114. As the data origin 102 typically generates a significant amount of data 104 (e.g., data per experiment), it is not feasible to keep such data in Hot Storage 401 (e.g., a distributed parallel file system, solid-state drive (SSD), etc.) for a long period. Accordingly, the data 104 may be kept in Warm Storage 402 (e.g., object storage) instead of Hot Storage 401. When there is a need for data processing, the data 104 can be moved to the Hot Storage 401 via a self-service model using a Dataset Management (DSM) utility 116 as disclosed herein. The DSM utility 116 can permit or otherwise facilitate creation of a POSIX distributed filesystem by a user and retrieval of the appropriate datasets from Warm Storage 402 to Hot Storage 401. The POSIX file system may be attached in an HPC cluster (e.g., compute nodes 403) for processing. By way of example, Lustre is a high-performance distributed file system and can act as a front end to S3 data and present S3 data in a POSIX based filesystem to the compute nodes 403. However, such a file system is financially expensive. In order to minimize the storage cost, the disclosed DSM utility 116 provides on-demand provision of a cloud-based file system, for example. A Lustre file system is an example of the cloud-based file system that can be provided. A user may create a Lustre file system pointing to a dataset when running a job. The Lustre file system can serve as a staging storage for the processing, sync the results back to S3 object storage once the job is complete, and delete the Lustre file system using the DSM utility 116.

The DSM utility 116 may create a new custom size distributed file system by targeting the datasets to be processed. The DSM utility 116 can mount the distributed file system on a HPC cluster (e.g., compute nodes 403) for staging the processed data. The DSM utility 116 can sync the modified datasets back to the S3 object store. The DSM utility 116 can enable viewing of the files available in the S3 object store. The DSM utility 116 can enable a self-service data life cycle management. Typically such functions require the assistance of technically trained users, however, the DSM utility 116 permits non-technical users to perform these tasks.

Figure 5:
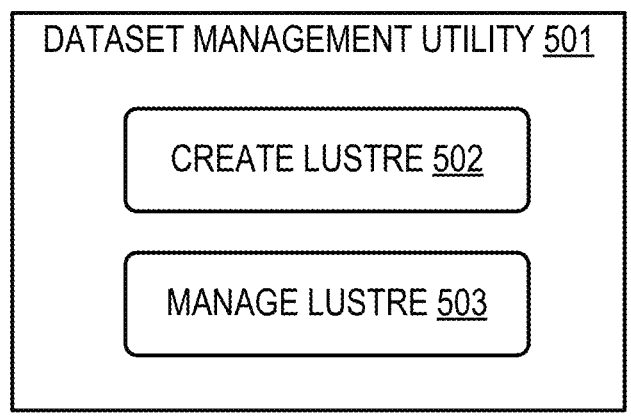
FIG. 5 shows an example graphical user interface.

FIG. 5 shows a graphical user interface 501 for the DSM utility 116. The graphical user interface 501 provides a user with the ability to create and manage file systems for distributed workloads. As shown in FIG. 5, the graphical user interface 501 provides a menu of selectable options, comprising a first selectable option 502 (labeled "Create Lustre") and a second selectable option 503 (labeled "Manage Lustre"). The first selectable option 502 permits a user to browse through a data store on S3 to view files and directories and to create a file system (e.g., a Lustre file system) from any location on S3. The second selectable option 503, once a Lustre file system is created, permits a user to mount a file system to view the file system from an operating system (O/S) level and access data within the file system. The second selectable option 503, once a Lustre file system is created, also permits a user save data so S3 and, while working with the file system, also permits the user to create new data or modify existing data in the file system. To make this data persistent even after deleting the file system, the user may export data back to a data store (S3). The second selectable option 503, once a Lustre file system is created, permits a user to view the status of export jobs. A user can switch between export job status and file systems view. The second selectable option 503, once a Lustre file system is created, once the task is complete, permits a user to delete a file system.

As shown in FIG. 6A, upon selecting (e.g., clicking) the first selectable option 502 ("Create Lustre"), the graphical user interface 501 provides the contents of the data store, Warm Storage. The user can drill down into any of the directories to view subfolders by double clicking on the specific directory. The visual selectable element 602 (labeled "Previous Directory") permits the user to go back by one step. The visual selectable element 603 (labeled "Refresh Dataset") permits the user to go to the top level screen. The visual selectable element 603 may also serve as a refresh marking to fetch the latest data from the data store. Once a user has selected a directory to load, selecting the visual selectable element 604 (labeled "Load Dataset") cause initiation of creation of a Lustre file system. As shown in FIG. 6B, the graphical user interface 501 provides the user the ability to adjust the size of the Lustre file system. By default, a Lustre file system may be created with 7.2 TB of storage space, which can be altered by moving the slider indicium 610 to the left (decrease) or right (increase) to change storage capacity. A menu of selectable options also is shown in FIG. 6B, comprising a first selectable option 605 (labeled "Proceed") and a second selectable option 606 (labeled "Cancel"). Selecting the first selectable option 605 causes the Lustre file system to be created.

Figure 7:
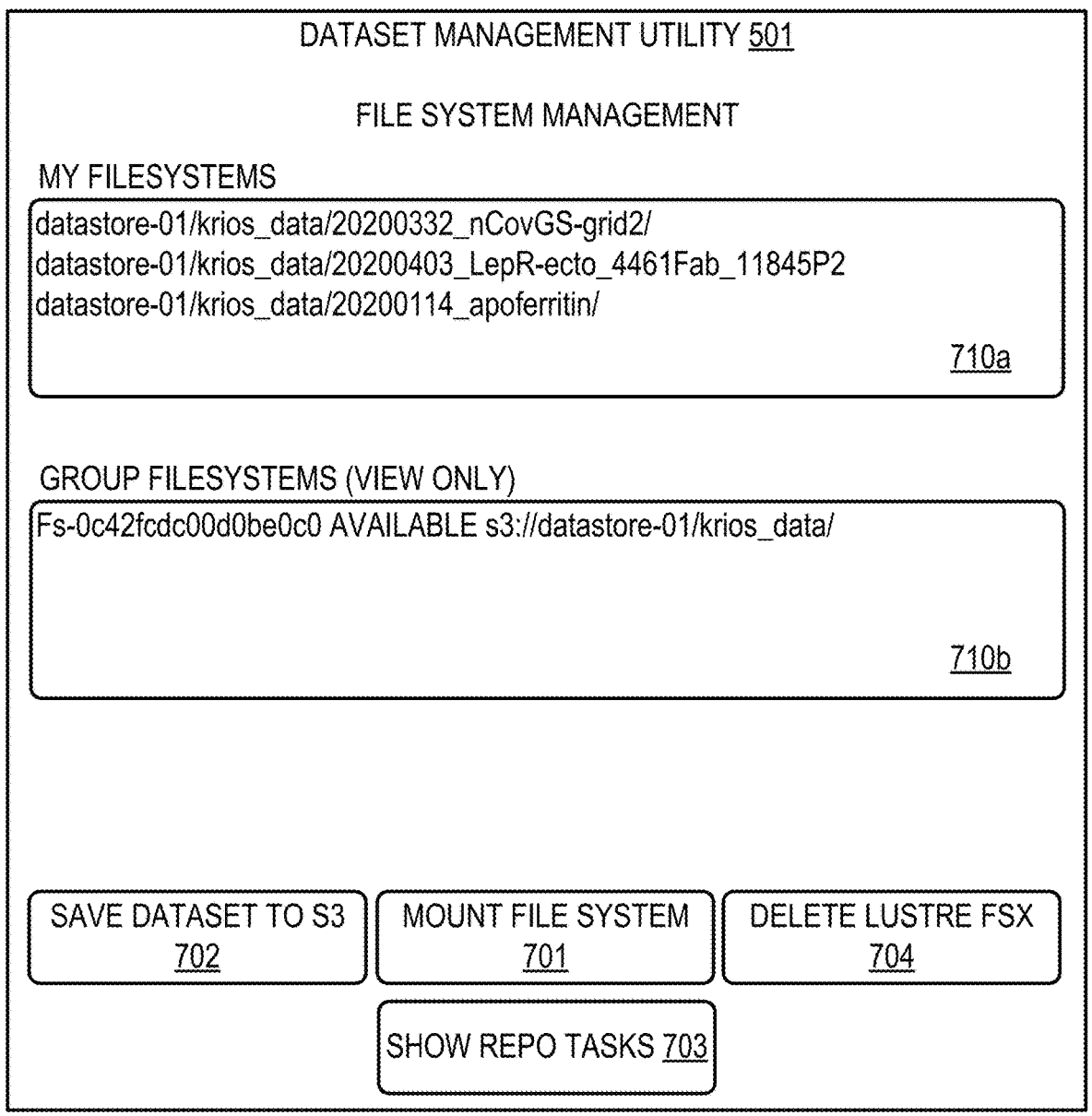
FIG. 7 shows an example graphical user interface.

As shown in FIG. 7, upon selecting the second selectable option 503 ("Manage Lustre"), the graphical user interface 501 provides an upper window 710a that displays all the file systems owned by the user and a lower window 710b that displays other file systems that are not owned by the user. The graphical user interface 501 shown in FIG. 7 also comprises a menu of selectable options, including a first selectable option 701 (labeled "Mount File System"), a second selectable option 702 (labeled "Save Data to S3"), a third selectable option 703 (labeled "Show Repo Tasks"), and a fourth selectable option 704 (labeled "Delete Lustre FSx"). Once file system creation is complete, the user needs to mount the file system on the O/S level to access files. To mount a file system, the user may select the file system to be mounted and further select (e.g., click on) the first selectable option 701 ("Mount File System"). As a data analysis job is running there could be new files created or existing files might be modified. To make new or changed data persistent, the data is to be saved to the data store (e.g., S3). For this operation the user may select the file system to be saved and further select (e.g., click on) the second selectable option 702 ("Save Dataset to S3"). To check the status of the repository task (e.g., saving a dataset to S3), the user may select the file system on which 'Save dataset S3' operation is being performed and further select (e.g., click on) the third selectable option 703 ("Show Repo Tasks") to be shown a screen listing repository job status. Once data analysis is complete on a file system, the user may delete the file system to save costs. To delete a file system, the user may select the file system to be deleted and further select (e.g., click on) the fourth selectable option ("Delete Lustre FSx"). The latter one of those selections can prompt the user to run "Save Dataset to S3" 702 before deleting the selected file system. Once confirmed, deletion of the file system may start.

Figure 4B:
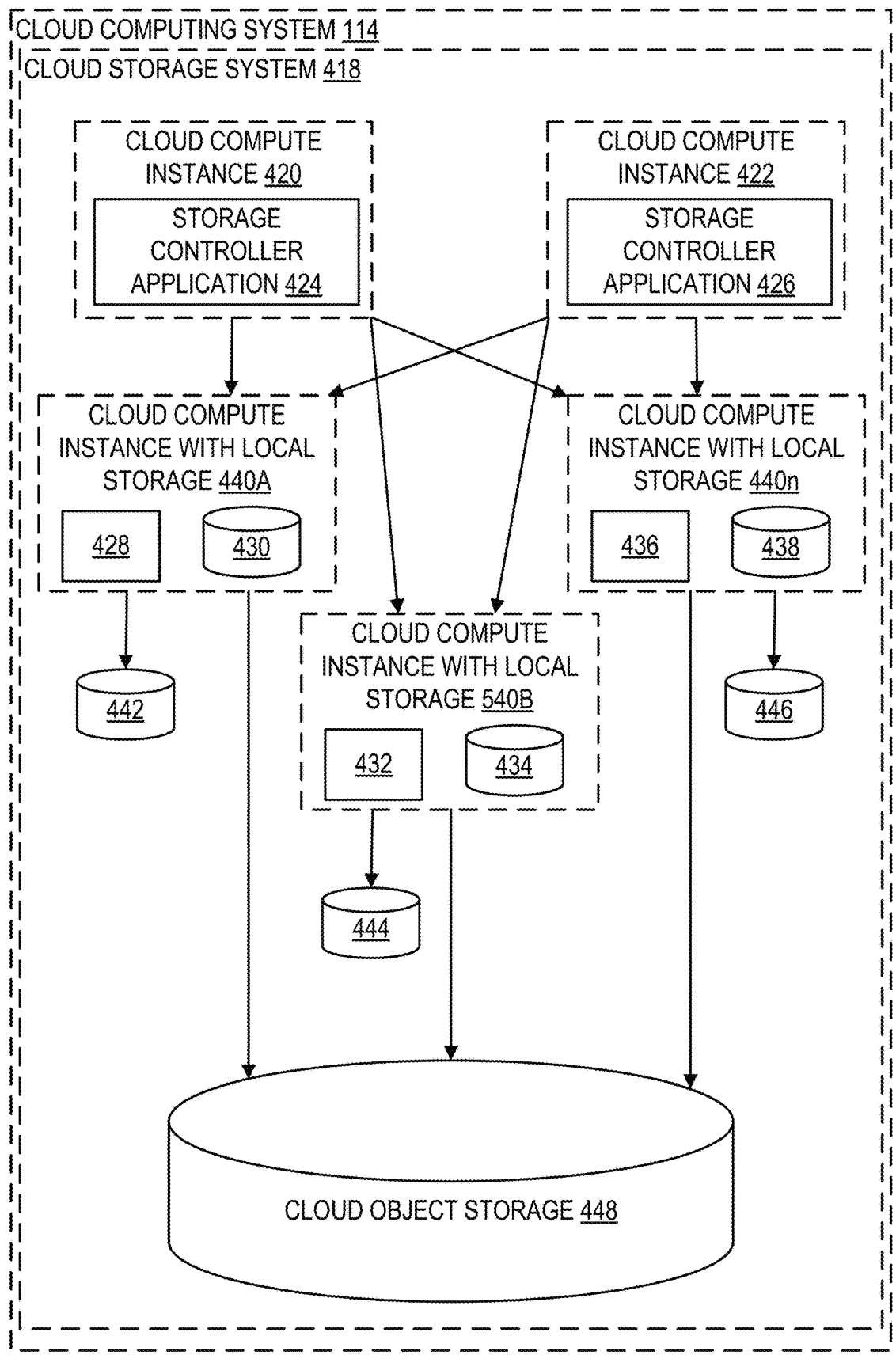
FIG. 4B shows an example cloud-based storage system.

For further explanation, FIG. 4B sets forth an example of a cloud-based storage system 418 of the cloud platform 114 in accordance with some embodiments of the present disclosure. In an embodiment, the DSM Utility 104 may be in communication the cloud storage system 418 and in an embodiment, may be embodied in one or more components shown in FIG. 4B (e.g., storage controller application, software daemon, and the like). In the example depicted in FIG. 4B, the cloud-based storage system 418 is created entirely in the cloud platform 114 such as, for example, Amazon Web Services (AWS')™, Microsoft Azure™, Google Cloud Platform™, IBM Cloud™, Oracle Cloud™, and others. The cloud-based storage system 418 depicted in FIG. 4B includes two cloud computing instances 420, 422 that each are used to support the execution of a storage controller application 424, 426. The cloud computing instances 420, 422 may be embodied, for example, as instances of cloud computing resources (e.g., virtual machines) that may be provided by the cloud platform 114 to support the execution of software applications such as the storage controller application 424, 426. For example, each of the cloud computing instances 420, 422 may execute on an Azure VM, where each Azure VM may include high speed temporary storage that may be leveraged as a cache (e.g., as a read cache). In one embodiment, the cloud computing instances 420, 422 may be embodied as Amazon Elastic Compute Cloud ('EC2') instances. In such an example, an Amazon Machine Image (AMU) that includes the storage controller application 424, 426 may be booted to create and configure a virtual machine that may execute the storage controller application 424, 426.

In the example method depicted in FIG. 4B, the storage controller application 424, 426 may be embodied as a module of computer program instructions that, when executed, carries out various storage tasks. For example, the storage controller application 424, 426 may be embodied as a module of computer program instructions that, when executed, carries out the same tasks associated with writing data to the cloud-based storage system 418, erasing data from the cloud-based storage system 418, retrieving data from the cloud-based storage system 418, monitoring and reporting of disk utilization and performance, performing redundancy operations, such as RAID or RAID-like data redundancy operations, compressing data, encrypting data, deduplicating data, and so forth. Because there are two cloud computing instances 420, 422 that each include the storage controller application 424, 426, in some embodiments one cloud computing instance 420 may operate as the primary controller as described above while the other cloud computing instance 422 may operate as the secondary controller as described above. The storage controller application 424, 426 depicted in FIG. 4B may include identical source code that is executed within different cloud computing instances 420, 422 such as distinct EC2 instances.

Other embodiments may not include a primary and secondary controller and are within the scope of the present disclosure. For example, each cloud computing instance 420, 422 may operate as a primary controller for some portion of the address space supported by the cloud-based storage system 418, each cloud computing instance 420, 422 may operate as a primary controller where the servicing of I/O operations directed to the cloud-based storage system 418 are divided in some other way, and so on. In fact, in other embodiments where costs savings may be prioritized over performance demands, only a single cloud computing instance may exist that contains the storage controller application.

The cloud-based storage system 418 depicted in FIG. 4B includes cloud computing instances 440A, 440B, and 440n with local storage 430, 434, and 438. The cloud computing instances 440A, 440B, and 440n may be embodied, for example, as instances of cloud computing resources that may be provided by the cloud platform 114 to support the execution of software applications. The cloud computing instances 440A, 440B, and 440n of FIG. 4B may differ from the cloud computing instances 420, 422 described above as the cloud computing instances 440A, 440B, and 440n of FIG. 4B have local storage 430, 434, and 438 resources whereas the cloud computing instances 420, 422 that support the execution of the storage controller application 424, 426 need not have local storage resources. The cloud computing instances 440A, 440B, and 440n with local storage 430, 434, and 438 may be embodied, for example, as EC2 M5 instances that include one or more SSDs, as EC2 R5 instances that include one or more SSDs, as EC2 I3 instances that include one or more SSDs, and so on. In some embodiments, the local storage 430, 434, and 438 may be embodied as solid-state storage (e.g., SSDs) rather than storage that makes use of hard disk drives. Hot storage 401 may include one or more of the local storage 430, 434, and 438.

In the example depicted in FIG. 4B, each of the cloud computing instances 440A, 440B, and 440n with local storage 430, 434, and 438 can include a software daemon 428, 432, 436 that, when executed by a cloud computing instance 440A, 440B, and 440n can present itself to the storage controller applications 424, 426 as if the cloud computing instance 440A, 440B, and 440n were a physical storage device (e.g., one or more SSDs). In such an example, the software daemon 428, 432, 436 may include computer program instructions similar to those that would normally be contained on a storage device such that the storage controller applications 424, 426 can send and receive the same commands that a storage controller would send to storage devices. In such a way, the storage controller applications 424, 426 may include code that is identical to (or substantially identical to) the code that would be executed by the controllers in the storage systems described above. In these and similar embodiments, communications between the storage controller applications 424, 426 and the cloud computing instances 440A, 440B, and 440n with local storage 430, 434, and 438 may utilize iSCSI, NVMe over TCP, messaging, a custom protocol, or in some other mechanism.

In the example depicted in FIG. 4B, each of the cloud computing instances 440A, 440B, and 440n with local storage 430, 434, and 438 may also be coupled to block storage 442, 444, 446 that is offered by the cloud platform 114 such as, for example, as Amazon Elastic Block Store ('EBS') volumes. Hot storage 401 may include one or more of the block storage 442, 444, and 446. In such an example, the block storage 442, 444, 446 that is offered by the cloud platform 114 may be utilized in a manner that is similar to how the NVRAM devices described above are utilized, as the software daemon 428, 432, 436 (or some other module) that is executing within a particular cloud comping instance 440A, 440B, and 440n may, upon receiving a request to write data, initiate a write of the data to its attached EBS volume as well as a write of the data to its local storage 430, 434, 438 resources. In some alternative embodiments, data may only be written to the local storage 430, 434, 438 resources within a particular cloud comping instance 440A, 440B, 440n. In an alternative embodiment, rather than using the block storage 442, 444, 446 that is offered by the cloud platform 114 as NVRAM, actual RAM on each of the cloud computing instances 440A, 440B, 440n with local storage 430, 434, 438 may be used as NVRAM, thereby decreasing network utilization costs that would be associated with using an EBS volume as the NVRAM. In yet another embodiment, high performance block storage resources such as one or more Azure Ultra Disks may be utilized as the NVRAM.

The storage controller applications 424, 426 may be used to perform various tasks such as deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 440A, 440B, 440n with local storage 430, 434, 438. Either cloud computing instance 420, 422, in some embodiments, may receive a request to read data from the cloud-based storage system 418 and may ultimately send a request to read data to one or more of the cloud computing instances 440A, 440B, 440n with local storage 430, 434, 438.

When a request to write data is received by a particular cloud computing instance 440A, 440B, 440n with local storage 430, 434, 438, the software daemon 428, 432, 436 may be configured to not only write the data to its own local storage 430, 434, 438 resources and any appropriate block storage 442, 444, 446 resources, but the software daemon 428, 432, 436 may also be configured to write the data to cloud object storage 448 that is attached to the particular cloud computing instance 440A, 440B, 440n. The cloud object storage 448 that is attached to the particular cloud computing instance 440A, 440B, 440n may be embodied, for example, as Amazon Simple Storage Service ('S3'). In other embodiments, the cloud computing instances 420, 422 that each include the storage controller application 424, 426 may initiate the storage of the data in the local storage 430, 434, 438 of the cloud computing instances 440A, 440B, 440n and the cloud object storage 448. In other embodiments, rather than using both the cloud computing instances 440A, 440B, 440n with local storage 430, 434, 438 (also referred to herein as 'virtual drives') and the cloud object storage 448 to store data, a persistent storage layer may be implemented in other ways. For example, one or more Azure Ultra disks may be used to persistently store data (e.g., after the data has been written to the NVRAM layer). Warm storage 402 may include the cloud object storage 448. Thus, in an embodiment, the DSM utility 116 may be in communication with the cloud object storage 448, the local storage (430, 434, 438), and/or the block storage (442, 444, and 446). As described herein, the DSM utility 116 may be configured to permit or otherwise facilitate creation of a distributed file system by a user and retrieval of datasets from Warm Storage 402 to Hot Storage 401. In this manner, the DSM utility 116 enables creation of a file system on the cloud object storage 448, the local storage (430, 434, 438), and/or the block storage (442, 444, and 446). The DSM utility 116 supports transfer of data sets from the cloud object storage 448 to/from the local storage (430, 434, 438) and/or the block storage (442, 444, and 446).

While the local storage 430, 434, 438 resources and the block storage 442, 444, 446 resources that are utilized by the cloud computing instances 440A, 440B, 440n may support block-level access, the cloud object storage 448 that is attached to the particular cloud computing instance 440A, 440B, 440n supports only object-based access. The software daemon 428, 432, 436 may therefore be configured to take blocks of data, package those blocks into objects, and write the objects to the cloud object storage 448 that is attached to the particular cloud computing instance 440A, 440B, 440n.

Consider an example in which data is written to the local storage 430, 434, 438 resources and the block storage 442, 444, 446 resources that are utilized by the cloud computing instances 440A, 440B, 440n in 1 MB blocks. In such an example, assume that a user of the cloud-based storage system 418 issues a request to write data that, after being compressed and deduplicated by the storage controller application 424, 426 results in the need to write 5 MB of data. In such an example, writing the data to the local storage 430, 434, 438 resources and the block storage 442, 444, 446 resources that are utilized by the cloud computing instances 440A, 440B, 440n is relatively straightforward as 5 blocks that are 1 MB in size are written to the local storage 430, 434, 438 resources and the block storage 442, 444, 446 resources that are utilized by the cloud computing instances 440A, 440B, 440n. In such an example, the software daemon 428, 432, 436 may also be configured to create five objects containing distinct 1 MB chunks of the data. As such, in some embodiments, each object that is written to the cloud object storage 448 may be identical (or nearly identical) in size. In such an example, metadata that is associated with the data itself may be included in each object (e.g., the first 1 MB of the object is data and the remaining portion is metadata associated with the data). The cloud object storage 448 may be incorporated into the cloud-based storage system 418 to increase the durability of the cloud-based storage system 418.

In some embodiments, all data that is stored by the cloud-based storage system 418 may be stored in both: 1) the cloud object storage 448, and 2) at least one of the local storage 430, 434, 438 resources or block storage 442, 444, 446 resources that are utilized by the cloud computing instances 440A, 440B, 440n. In such embodiments, the local storage 430, 434, 438 resources and block storage 442, 444, 446 resources that are utilized by the cloud computing instances 440A, 440B, 440n may effectively operate as cache that generally includes all data that is also stored in S3, such that all reads of data may be serviced by the cloud computing instances 440A, 440B, 440n without requiring the cloud computing instances 440A, 440B, 440n to access the cloud object storage 448. In other embodiments, however, all data that is stored by the cloud-based storage system 418 may be stored in the cloud object storage 448, but less than all data that is stored by the cloud-based storage system 418 may be stored in at least one of the local storage 430, 434, 438 resources or block storage 442, 444, 446 resources that are utilized by the cloud computing instances 440A, 440B, 440n. In such an example, various policies may be utilized to determine which subset of the data that is stored by the cloud-based storage system 418 should reside in both: 1) the cloud object storage 448, and 2) at least one of the local storage 430, 434, 438 resources or block storage 442, 444, 446 resources that are utilized by the cloud computing instances 440A, 440B, 440n.

One or more modules of computer program instructions that are executing within the cloud-based storage system 418 (e.g., a monitoring module that is executing on its own EC2 instance) may be designed to handle the failure of one or more of the cloud computing instances 440A, 440B, 440n with local storage 430, 434, 438. In such an example, the monitoring module may handle the failure of one or more of the cloud computing instances 440A, 440B, 440n with local storage 430, 434, 438 by creating one or more new cloud computing instances with local storage, retrieving data that was stored on the failed cloud computing instances 440A, 440B, 440n from the cloud object storage 448, and storing the data retrieved from the cloud object storage 448 in local storage on the newly created cloud computing instances.

Various performance aspects of the cloud-based storage system 418 may be monitored (e.g., by a monitoring module that is executing in an EC2 instance) such that the cloud-based storage system 418 can be scaled-up or scaled-out as needed. For example, if the cloud computing instances 420, 422 that are used to support the execution of a storage controller application 424, 426 are undersized and not sufficiently servicing the I/O requests that are issued by users of the cloud-based storage system 418, a monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 420, 422 that are used to support the execution of a storage controller application 424, 426 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Returning to FIG. 1, the cloud platform 114 may comprise a plurality of compute nodes (not depicted in FIG. 1, for the sake of simplicity). The plurality of compute nodes communicate with the storage system of the cloud platform 114. The plurality of compute nodes may comprise respective processing devices of one or more processing platforms. For example, the plurality of compute nodes may comprise respective virtual machines (VMs) each having a processor and a memory, although numerous other configurations are possible. The plurality of compute nodes may additionally or alternatively be part of cloud infrastructure, such as an Amazon Web Services (AWS) system. Other examples of cloud-based systems that can be used to provide compute nodes include Google Cloud Platform (GCP) and Microsoft Azure. The plurality of compute nodes, in some embodiments, illustratively provide compute services such as execution of one or more application programs on behalf of each of one or more users associated with respective ones of the plurality of compute nodes. The plurality of compute nodes can be configured for parallel computation.

In an embodiment, the cloud platform 114 may be part of a data analysis system. For example, the cloud platform 114 may provide a 3D structure estimation service, a genetic data analysis service (e.g., GEWAS, PHEWAS, etc.), and the like. The cloud platform 114 may be configured to perform such data analysis via one or more data analysis modules 118. The data analysis module(s) 118 can be configured to leverage a computation module 120. The computation module 120 may be configured to generate a program template that may be used by at least one of the data analysis module(s) 118 to govern the execution of one or more processes/tasks, such as the use of GPU-based computing. The data analysis module(s) 118 may be configured to output a data analysis result, such as an estimated 3D structure of a target in a resultant 3D map (e.g., a 3D model). The cloud platform 114 may also comprise a remote display module 122. The remote display module 122 may comprise a high-performance remote display protocol configured to securely deliver remote desktops and application streaming to another computing device 124. For example, the remote display module 122 may be configured as NICE DCV.

Figures 8A, 8B:
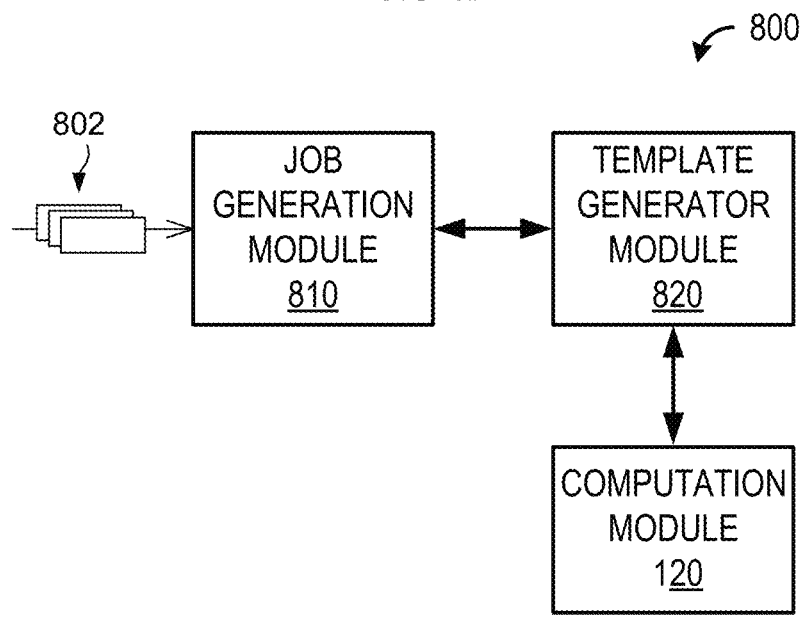
FIG. 8A shows an example program template.
FIG. 8B shows an example operating environment.

In an embodiment, the data analysis module 118 may be an application program configured to perform image reconstructions (e.g., a reconstruction module). Such an application program (e.g., the reconstruction module) can be configured to execute a reconstruction technique to determine a likely molecular structure. Any known technique for determining the likely molecular structure may be used. In an embodiment, the application program may comprise RELION. RELION is an open-source program configured to apply an empirical Bayesian approach, in which optimal Fourier filters for alignment and reconstruction are derived from data in a fully automated manner. The computation module 120 may be configured to determine one or more job parameters for the data analysis module 118. The one or more jobs parameters may be referred to as a program template. The program template may enable an application program to manage programs and/or jobs. The program template may enable an application program to leverage computational resources, including, for example, CPU processing time and/or GPU processing time. By way of example, a program template may enable an application program (e.g., a reconstruction module) to determine a level of detail to be extracted from raw data 104 (e.g., raw image data files and/or raw video data files). In an embodiment, the job parameters may comprise one or more of a number of Message Passing Interfaces (MPIs), a number of threads, a number of compute nodes, desired wall-clock time, combinations thereof, and the like. A particular configuration of jobs parameters constitutes a particular program template. In one example, a program template is defined by a number of MPIs, a number of threads, and a number of compute nodes. The computation module 120 may be configured to determine such job parameters for one or more portions of a given application program, to include for each of one or more given tasks or processes of the given application program. FIG. 8A shows examples of program templates. The program templates are identified by respective template names. In some cases, a template name identifies a file that contains the program template; that is, the file that contains the one or more job parameters defining the program template.

As described herein, the computation module 120 may assume that the larger the number of MPIs and threads for a job, the more performance is gained (e.g., less time consumed for job completion). The computation module 120 may assume that disabling hyperthreaded cores may benefit performance. The computation module 120 may implement one or more parameters that specify a multi-GPU and multi-core infrastructure setup with hyperthreaded cores disabled. The computation module 120 may be configured to run one or more simulations in order to determine one or more jobs parameters defining a program template that is satisfactory (e.g., optimal or nearly optimal) for a program application or a tasks thereof. For example, the computation module 120 may equate the number of MPIs to that of available GPU cards and the number of threads to that of available CPU cores on a node. Following this observation, a combination of multi-node jobs (e.g., 2, 4, 6, 12 node jobs, and the like) may be performed and performance benchmarks compiled. Based on the performance benchmarks, a combination of number of MPI threads and compute nodes for a job at which performance is saturated may be determined, indicating that no performance gain is observed beyond this parallelism.

In an embodiment, disclosed is a multi-queue model to execute jobs on a GPU vs CPU based compute. In an embodiment, a disclosed Cryo-EM system may use RELION and CryoSPARC applications to process images. A workflow may comprise a sequence of jobs (for example, 8 jobs) to run to complete image processing. The workflow may comprise an amount of computationally light steps and an amount of steps that demand significant resources (CPU vs GPU). Having the compute nodes set to GPU-based processing for all workflow processing can be costly when handling jobs that only require CPU-based processing.

In an embodiment, a multi-queueing system may be implemented on an (HPC) cluster. An HPC cluster may comprise hundreds or thousands of compute servers that are networked together. Each server is called a node. The nodes in each cluster work in parallel with each other, boosting processing speed to deliver high performance computing. A queue may be configured to run with CPU-based compute instances and another queue may be configured to run with GPU-based compute instances. Users may have an option to choose the required queue to run a specific job and/or workflow.

In an embodiment, a method is disclosed to use the best available resources. As mentioned, RELION is an open-source software package configured to process Cryo-EM data and produce protein structure images. Execution of that software depends on various job parameters which determine how the software uses the underlying compute resources. Any misconfigurations in these job parameters will lead to poor utilization of the resource, and thus increase the operational cost to a great extent and the job run-time.

Cryo-EM jobs resource usage in a cluster for all job types (CPU-based jobs and GPU-based jobs) may be determined over time. The disclosed methods may manage the resources available in the cluster effectively to reduce the jobs runtime and cost associated with the compute and distributed storage. The disclosed methods may be applied in multiple phases of job execution. The disclosed methods may observe Cryo-EM jobs resource usage data over time and determine an optimized pattern in a template file for future use. That optimized pattern defines a program template—that is, a defined set of multiple job parameters. Such an optimized pattern may enable completion of jobs many times (e.g., six to eight times) faster by using fewer compute resources.

In an embodiment, as is shown in FIG. 8B, a computing environment 800 may generate program templates, in accordance with aspects described herein. The computing environment 800 may include a job generation module 810 that can receive data 802. In some cases, the data can be received from the data origin 102. In other cases, the data 802 can be synthetic in that it may generated by a computing device for the purpose of executing a simulated reconstruction. The job generation module 810 can generate jobs, or tasks associated with jobs, to reconstruct one or more targets. In some cases, rather than solving a realistic reconstruction, the job generation module 810 may select subsets of the data 802 and may generate or otherwise schedule a job directed to performing an abridged simulation (or reconstruction).

The job generated in that such a fashion may be sent to a template generator module 820 that may generate various configurations of job parameters. Such configurations can be referred to as job configurations. Each job configuration includes particular values of respective job parameters. Thus, such job configurations correspond to respective candidate program templates. The template generator module 820 may apply numerous strategies to generate job configurations. In some cases, the template generator module 820 may generate job configurations randomly. In other cases, the template generator module 820 may rely on a perturbative approach whereby the template generator module 820 generates variations of pre-existing configurations that have been used in production (or actual) reconstruction of targets. The template generator module 820 may send a job configuration to the computation module 120 for execution in the cloud platform 114 according to the job parameters defined in the job configuration. The template generator module 820 may collect or otherwise receive metrics indicative of performance of the execution of job using a particular job. Numerous metrics can be collected. Examples of metrics include wall-clock time, GPU time, CPU time, number of I/O operations, execution cost, and the like. Values of the metrics that are collected serve as feedback on fitness of a job configuration for a job. The template generator module 820 can iteratively generate job configurations for the job until a satisfactory performance has been achieved. To that end, the template generator module 820 may explore the space of job parameters using one of various optimization solvers, such as steepest descent, Monte Carlo simulations, genetic algorithm, or similar. A job configuration that results in a satisfactory performance (e.g., optimal performance) can determine satisfactory values of the job parameters. Such values define a program template.

Similar optimization may be carried out for various types of reconstructions or tasks that are part of the reconstruction. Each optimization yielding a program template.

Figure 8C:
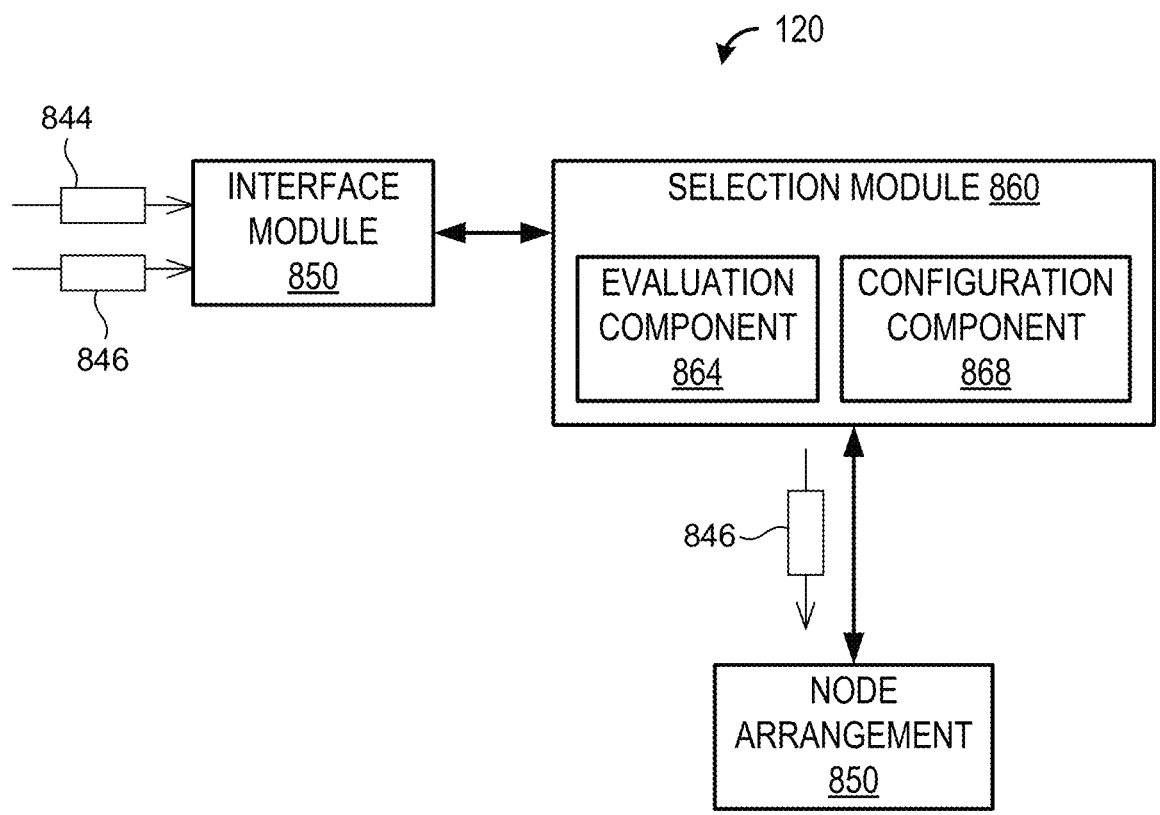
FIG. 8C shows an example operating environment.

The data analysis module 118 may execute one or more jobs according to the program template in order to analyze data. To that end, in some cases, the compute module 120 may select compute nodes within the cloud platform 114 to execute a computing job or task that is part of the computing job. The selected compute nodes can be part of the compute nodes 403 (FIG. 4). In an embodiment, as is shown in FIG. 8C, the computation module 120 includes an interface module 850 that may receive a program template 844 and data 846 defining the job. That program template 844 specifies a set of multiple job parameters and serves as a condition for the selection of compute nodes within the cloud platform 114. For example, the program template can specify n MPIs, m threads, and q compute nodes for a task (e.g., a reconstruction task) to be executed. The cloud platform 114 can include multiple sets of q compute nodes that can be selected to execute the task. Additionally, at least some of the compute nodes may have respective processors, each having multiple cores that may support the m threads. Similarly, other compute nodes may support, for example, the n MPIs. Accordingly, the cloud platform 114 may support multiple arrangements, or allocations, consistent with the program template.

In an embodiment, as is shown in FIG. 8C, the computation module 120 includes a selection module 860 that can evaluate a candidate arrangement consistent with the program template. To evaluate a candidate arrangement, the evaluation component 864 may determine respective performance metrics of respective workloads on respective compute nodes that form the candidate arrangement. The respective workloads may include the computing job defined by the data 846. The computing device 106 (FIG. 1) may request the computing job. The evaluation component 864 may determine the respective performance metrics based on respective measured performance data of compute nodes in a candidate arrangement. The computation module 120 may obtain the measured performance data from one or more components within the cloud platform 114. The measured performance data can include, e.g., present usage or supply of one or more resources, or other data. The measured performance data can also include or be based on processed data, e.g., values derived from the measured data such as statistics of the measured data. For example, the average CPU usage and/or average GPU usage on a compute node can be included in the measured performance data for the nodes in the candidate arrangement.

The selection module 860 can include a configuration component 868 that can traverse a set of multiple candidate arrangements, evaluating each (or, in some cases, at least some) candidate arrangement. That traversal can result in multiple fitness scores for respective candidate arrangements. The configuration component 868 can rank the multiple candidate arrangements according to fitness score and can then to select a highest-ranked or high-ranked one of the candidate arrangements as a node arrangement 850 to be utilized to execute the computing job defined by the data 846.

The data analysis module 118 may store the results of any data analysis in a file system of the cloud platform 114 and/or may provide the results back to the computing device 106. The DSM utility 116 may be used to save the results of the data analysis from the file system to a data store and delete the file system.

Figure 10:
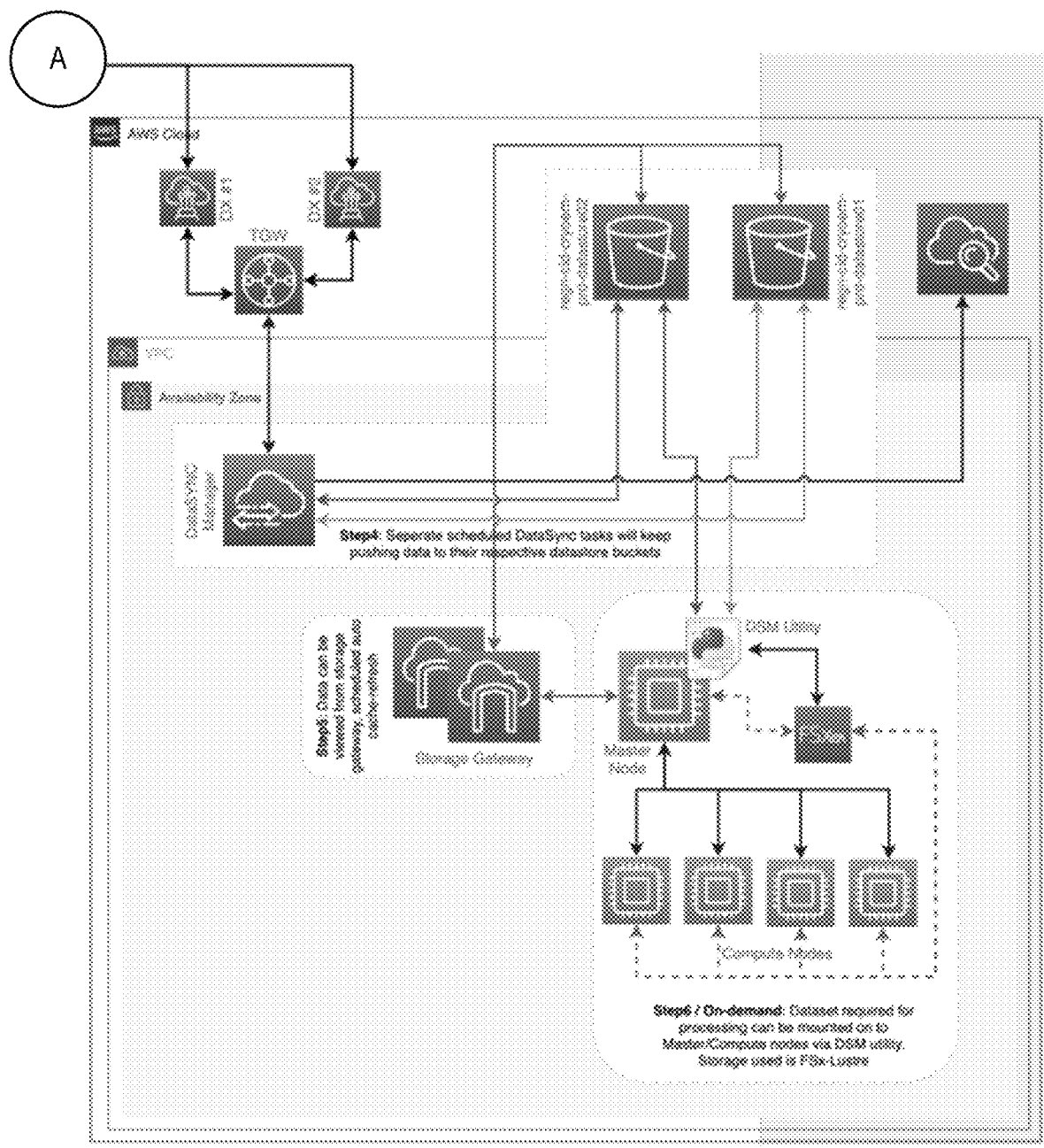
FIG. 10 shows an example operating environment.

FIG. 9 and FIG. 10 show an example system and method wherein data may be generated via electron microscopy and cached in a respective support computing device. Multiple electron microscopes can generate imaging data as part of respective electron microscopy experiments. Support computing devices functionally coupled to respective ones of the electron microscopes can obtain and cache imaging data. The imaging data from a support computing device may be pushed to a local staging area. On a schedule (e.g., hourly, daily, at defined times, etc.), imaging data from the staging area may be pushed into a storage system, such as cloud-based storage (e.g., AWS S3). Separate scheduled data sync tasks may keep pushing data into respective datastore buckets (e.g., S3 buckets). Imaging data can be viewed from a storage gateway. Scheduled auto cache-refresh may be used. Datasets required for processing may be mounted on to master/compute notes via the DSM utility and storage used may be distributed and/or parallel (e.g., FSx-Lustre).

Figure 11:
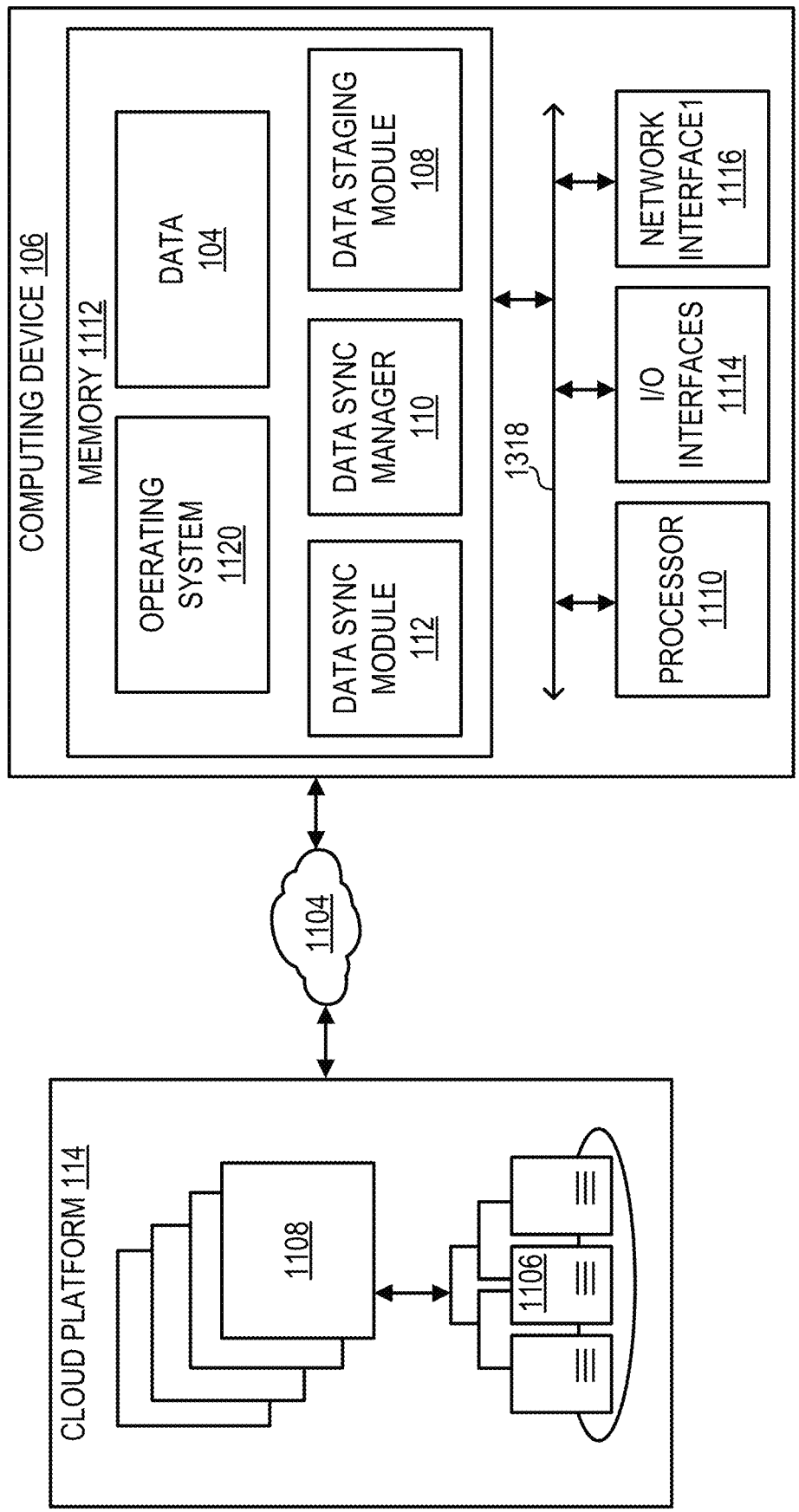
FIG. 11 shows an example operating environment.

FIG. 11 is a block diagram depicting an environment 1100 comprising non-limiting examples of the computing device 106 and the cloud platform 114 connected through a network 1104. In an aspect, some or all steps of any described method may be performed on a computing device and/or cloud platform as described herein. The computing device 106 can comprise one or multiple computers configured to store one or more of the data 104, the data sync manager 110, and/or the data sync module 112. The cloud platform 114 can comprise a high-throughput storage system 1106 configured to store the data 104, the DSM utility 116, the data analysis module(s) 118, the computation module 120, the remote display module 122, and/or one or more compute nodes 1108 configured to process the data 104. The cloud platform 114 can communicate with the computing device 106 via the network 1104.

The computing device 106 and the cloud platform 114 can be one or more digital computers that, in terms of hardware architecture, generally includes a processor 1110, memory system 1112, input/output (I/O) interfaces 1114, and network interfaces 1116. These components (1110, 1112, 1114, and 1116) are communicatively coupled via a local interface 1118. The local interface 1118 can be, for example, but not limited to, one or more buses or other wired or wireless connections, as is known in the art. The local interface 1118 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1110 can be one or more hardware devices for executing software, particularly that stored in memory system 1112. The processor 1110 can be any custom made or commercially available processor, a central processing unit (CPU), an auxiliary processor among several processors associated with the computing device 106 and the cloud platform 114, a semiconductor-based microprocessor (in the form of a microchip or chip set), or generally any device for executing software instructions. When the computing device 106 and/or the cloud platform 114 is in operation, the processor 1110 can be configured to execute software stored within the memory system 1112, to communicate data to and from the memory system 1112, and to generally control operations of the computing device 106 and the cloud platform 114 pursuant to the software.

The I/O interfaces 1114 can be used to receive user input from, and/or for providing system output to, one or more devices or components. User input can be provided via, for example, a keyboard and/or a mouse. System output can be provided via a display device and a printer (not shown). I/O interfaces 1114 can include, for example, a serial port, a parallel port, a Small Computer System Interface (SCSI), an infrared (IR) interface, a radio frequency (RF) interface, and/or a universal serial bus (USB) interface.

The network interface 1116 can be used to transmit and receive from the computing device 106 and/or the cloud platform 114 on the network 1104. The network interface 1116 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 1116 may include address, control, and/or data connections to enable appropriate communications on the network 1104.

The memory system 1112 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1112 may incorporate electronic, magnetic, optical, and/or other types of storage media. Note that the memory system 1112 can have a distributed architecture, where various components are situated remote from one another, but can be accessed by the processor 1110.

The software in memory system 1112 may include one or more software programs, each of which comprises an ordered listing of executable instructions for implementing logical functions. In the example of FIG. 11, the software in the memory system 1112 of the computing device 106 can comprise the data 104, the data staging module 108, the data sync manager 110, the data sync module 112, the policies 260, a suitable operating system (O/S) 1120, and/or any other modules (for example modules disclosed in FIG. 1). In the example of FIG. 11, the software in the high-throughput storage system 1106 of the cloud platform 114 can comprise, the data 104, the DSM utility 116, the data analysis module(s) 118, the computation module 120, the remote display module 122, a suitable operating system (O/S) 1120, and/or any other modules (for example modules disclosed in FIG. 1). The operating system 1120 essentially controls the execution of other computer programs and provides scheduling, input-output control, file and data management, memory management, and communication control and related services.

For purposes of illustration, application programs and other executable program components such as the operating system 1120 are illustrated herein as discrete blocks, although it is recognized that such programs and components can reside at various times in different storage components of the computing device 106 and/or the cloud platform 114. An implementation of the data sync manager 110, the data sync module 112, the DSM utility 116, the data analysis module(s) 118, the computation module 120, and/or the remote display module 122 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and nonvolatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 12:
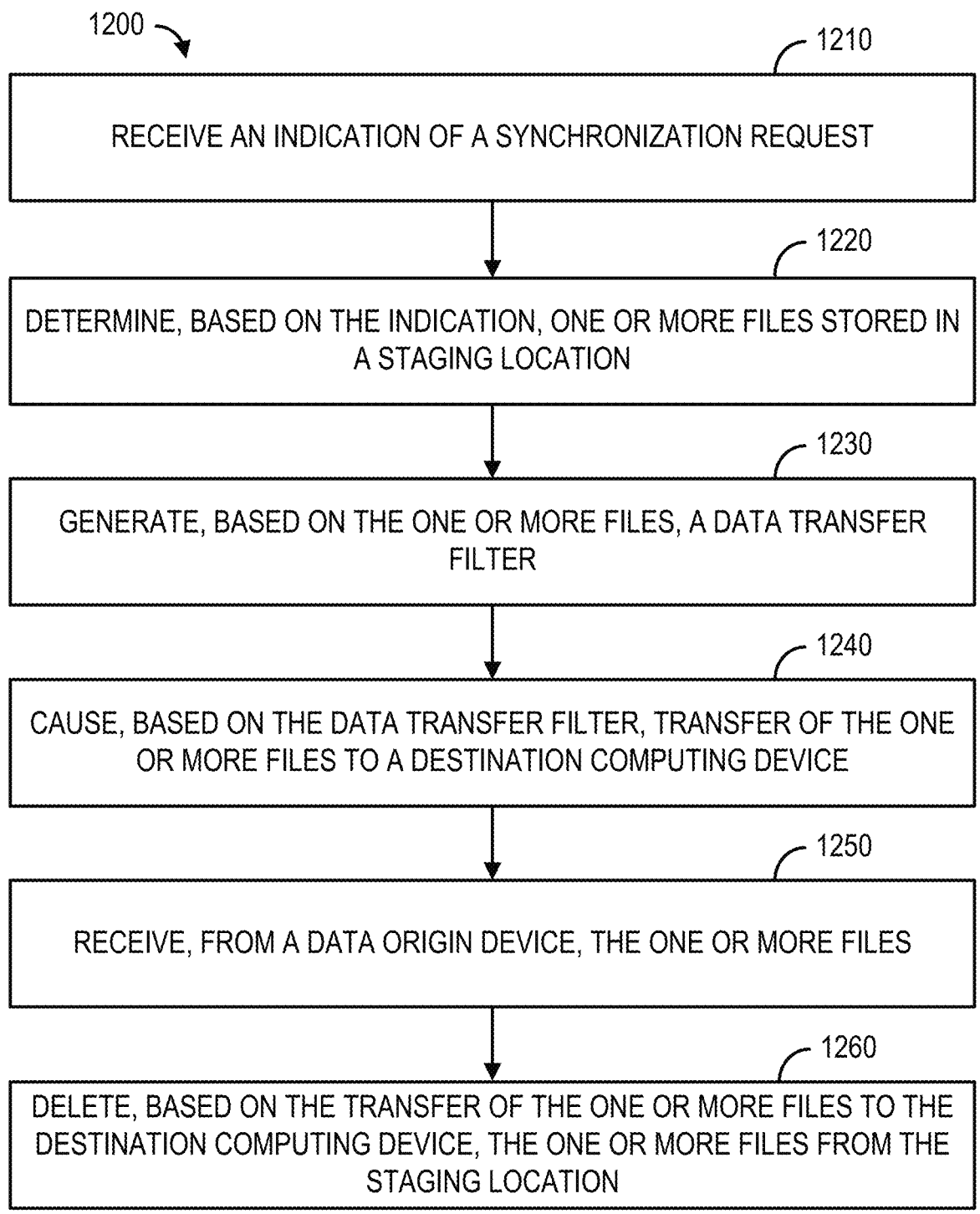
FIG. 12 shows an example method.

In an embodiment, the data sync manager 110 and/or the data sync module 112 may be configured to perform an example method 1200, shown in FIG. 12. The example method 1200 may be performed in whole or in part by a single computing device, a plurality of electronic devices, and the like. The example method 1200 may comprise, at block 1210, receiving an indication of a synchronization request. Receiving the indication of the synchronization request may be based on a synchronization condition. In some cases, the synchronization condition is a time interval. The indication comprises payload data conveying that data synchronization is to be implemented. In some cases, the indication may be embodied in a message invoking a function call to a data storage service, for example.

The example method 1200, at block 1220, may comprise determining, based on the indication, one or more files stored in a staging location. Various types of files may be determined. For example, the one or more files may comprise sequence data, particle images, or a combination of sequence data and particle image(s).

The example method 1200, at block 1230, may comprise generating, based on the one or more files, a data transfer filter. Generating the data transfer filter may comprise generating a message that invokes a function call to a cloud service (e.g., AWS DataSync), where the message passes the list of available files as an argument of the function call. The function call can initiate a task (or job) of the cloud service. The function call can be invoked according to an API implemented by the data storage service. In some cases, the data transfer filter comprises a list of the one or more files stored in the staging location.

The example method 1200, at block 1240, may comprise causing, based on the data transfer filter, transfer of the one or more files to a destination computing device. Causing such a transfer based on the data transfer filter, may comprise causing a data synchronization application program to scan the staging location and the destination computing device only for the one or more files.

The example method 1200, at block 1250, may comprise receiving, from a data origin device, the one or more files. The data origin device may comprise one or more of a sequencer or an electron microscope.

The example method 1200, at block 1260, may comprise deleting, based on the transfer of the one or more files to the destination computing device, the one or more files from the staging location.

Figure 13:
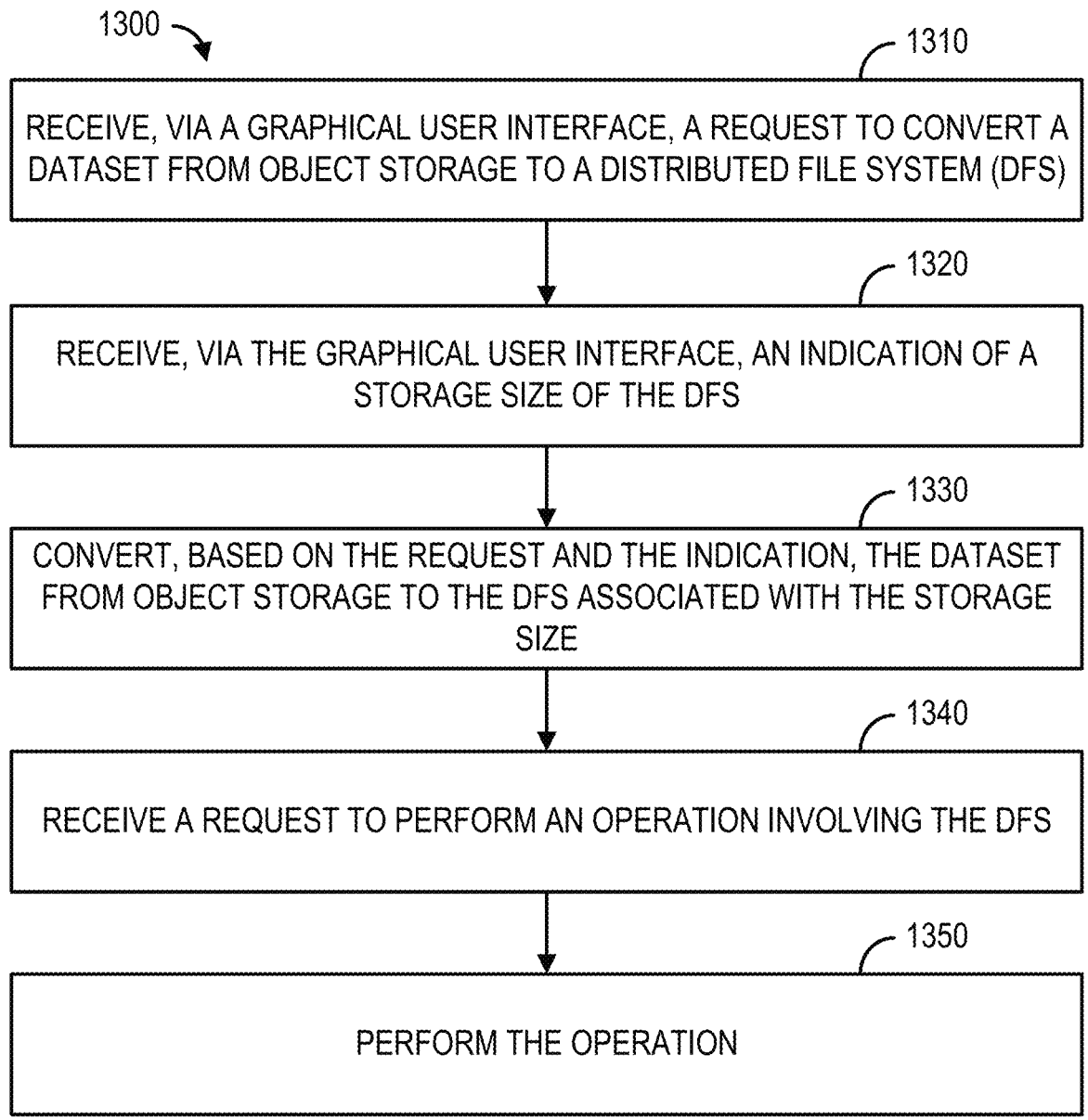
FIG. 13 shows an example method.

In an embodiment, the DSM utility 116 may be configured to perform an example method 1300, shown in FIG. 13. The method 1300 may be performed in whole or in part by a single computing device, a plurality of electronic devices, and the like. The example method 1300 may comprise, at block 1310, receiving, via a graphical user interface, a request to convert a dataset from object storage to a distributed file system.

The example method 1300, at block 1320, may comprise receiving, via the graphical user interface, an indication of a storage size of the distributed file system.

The example method 1300, at block 1330, may comprise converting, based on the request and the indication, the dataset from object storage to the distributed file system associated with the storage size.

The example method 1300, at block 1340, may comprise receiving a request to perform an operation involving the distributed file system. The example method 1300, at block 1350, may comprise performing the operation. The operation can be one or many operations involving the distributed file system. In one scenario, at block 1340, the example method 1300 comprises receiving, via the graphical user interface, a request to mount the distributed file system. Additionally, at block 1350, the example method 1300 comprises mounting the distributed file system. In another scenario, at block 1340, the example method 1300 comprises receiving, via the graphical user interface, a request to save data in the distributed file system into the object storage. Additionally, at block 1350, the example method 1300 comprises saving the data in the distributed file system into the object storage. In yet another scenario, at block 1340, the example method 1300 comprises receiving, via the graphical user interface, a request to delete the distributed file system. Additionally, at block 1350, the example method 1300 comprises deleting the distributed file system.

Figure 14:
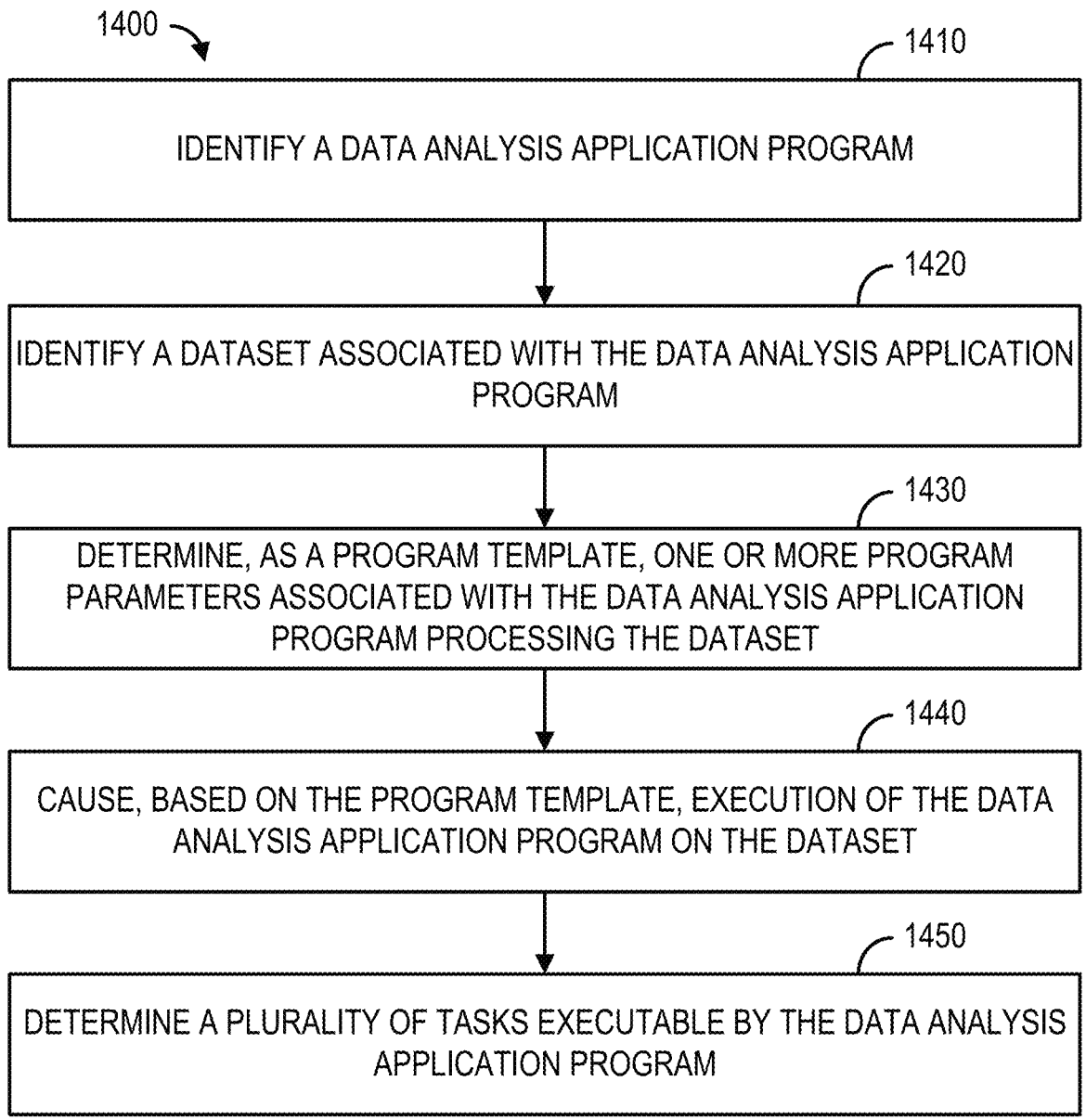
FIG. 14 shows an example method.

In an embodiment, the data analysis module(s) 118 and/or the computation module 120 may be configured to perform a method 1400, shown in FIG. 14. The method 1400 may be performed in whole or in part by a single computing device, a plurality of electronic devices, and the like. The method 1400 may comprise, at block 1410, identifying a data analysis application program.

The example method 1400, at block 1420, may comprise identifying a dataset associated with the data analysis application program.

The example method 1400, at block 1430, may comprise determining, as a program template, one or more job parameters associated with the data analysis application program processing the dataset. Determining the one or more job parameters associated with the data analysis application program processing the dataset may comprise determining one or more job parameters for each task of the plurality of tasks. The one or more job parameters may comprise one or more of a number of Message Passing Interfaces (MPIs), a number of threads, or a number of compute nodes.

The example method 1400, at block 1440, may comprise causing, based on the program template, execution of the data analysis application program on the dataset.

The example method 1400, at block 1450, may comprise determining a plurality of tasks executable by the data analysis application program.

In an embodiment, the data sync manager 110, the data sync module 112, the DSM utility 116, the data analysis module(s) 118, and/or the computation module 120 may be configured to perform an example method 1500, shown in FIG. 15. The example method 1500 may be performed in whole or in part by a single computing device, a plurality of electronic devices, and the like. The example method 1500 may comprise, at block 1510, receiving an indication of a synchronization request. The indication comprises payload data conveying that data synchronization is to be implemented. In some cases, the indication may be embodied in a message invoking a function call to a data storage service, for example. Receiving the indication of the synchronization request may be based on a synchronization condition. In some cases, the synchronization condition is a time interval.

The example method 1500, at block 1520, may comprise determining, based on the indication, one or more files stored in a staging location.

The example method 1500, at block 1530, may comprise generating, based on the one or more files, a data transfer filter.

The example method 1500, at block 1540, may comprise causing, based on the data transfer filter, transfer of the one or more files to object storage of a destination computing device.

The example method 1500, at block 1550, may comprise receiving, via a graphical user interface, a request to convert the one or more files from object storage to a distributed file system.

The example method 1500, at block 1560, may comprise receiving, via the graphical user interface, an indication of a storage size of the distributed file system.

The example method 1500, at block 1570, may comprise converting, based on the request and the indication, the one or more files from object storage to the distributed file system associated with the storage size.

The example method 1500, at block 1580, may comprise identifying a data analysis application program associated with the one or more files in the distributed file system.

The example method 1500, at block 1590, may comprise determining, as a program template, one or more job parameters associated with the data analysis application program processing the dataset.

The example method 1500, at block 1595, may comprise causing, based on the program template, execution of the data analysis application program the one or more files in the distributed file system. Numerous other embodiments emerge from the foregoing detailed description and annexed drawings. For instance, an Example 1 of those embodiments includes a method comprising receiving an indication of a synchronization request; determining, based on the indication, one or more files stored in a staging location; generating, based on the one or more files, a data transfer filter; and causing, based on the data transfer filter, transfer of the one or more files to a destination computing device.

An Example 2 of the numerous embodiments comprises the method of Example 1, where receiving the indication of the synchronization request is based on a synchronization condition.

An Example 3 of the numerous embodiments comprises the method of Example 2, where the synchronization condition is a time interval.

An Example 4 of the numerous embodiments comprises the method of Example 1, where the data transfer filter comprises a list of the one or more files stored in the staging location.

An Example 5 of the numerous embodiments comprises the method of Example 1, wherein generating, based on the one or more files, the data transfer filter comprises generating a message that invokes a function call to a cloud service, wherein the message passes one or more parameters identifying the one or more files as an argument of the function call.

An Example 6 of the numerous embodiments comprises the method of Example 1, where causing, based on the data transfer filter, transfer of the one or more files to the destination computing device comprises causing a data synchronization application program to scan the staging location and the destination computing device only for the one or more files.

An Example 7 of the numerous embodiments comprises the method of Example 1 and further comprises receiving, from a data origin device, the one or more files.

An Example 8 of the numerous embodiments comprises the method of Example 7, where the data origin device comprises one or more of a sequencer or an electron microscope.

An Example 9 of the numerous embodiments comprises the method of Example 8, where the one or more files comprise sequence data, particle images, or both.

An Example 10 of the numerous embodiments comprises the method of Example 1 and further comprises deleting, based on the transfer of the one or more files to the destination computing device, the one or more files from the staging location.

An Example 11 of those other numerous embodiments includes a method comprising receiving, via a graphical user interface, a request to convert a dataset from object storage to a distributed file system; receiving, via the graphical user interface, an indication of a storage size of the distributed file system; and converting, based on the request and the indication, the dataset from object storage to the distributed file system associated with the storage size.

An Example 12 of the numerous embodiments comprises the method of Example 11 and further comprises receiving, via the graphical user interface, a request to mount the distributed file system; and mounting the distributed file system.

An Example 13 of the numerous embodiments comprises the method of Example 11 and further comprises receiving, via the graphical user interface, a request to save data in the distributed file system into the object storage; and saving the data in the distributed file system into the object storage.

An Example 14 of the numerous embodiments comprises the method of Example 11 and further comprises receiving, via the graphical user interface, a request to delete the distributed file system; and deleting the distributed file system.

An Example 15 of the numerous embodiments includes a method comprising identifying a data analysis application program; identifying a dataset associated with the data analysis application program; determining, as a program template, one or more job parameters associated with the data analysis application program processing the dataset; and causing, based on the program template, execution of the data analysis application program on the dataset.

An Example 16 of the numerous embodiments comprises the method of Example 15, where the one or more job parameters comprise one or more of: a number of Message Passing Interfaces (MPIs), a number of threads, or a number of compute nodes.

An Example 17 of the numerous embodiments comprises the method of Example 15 and further comprises determining a plurality of tasks executable by the data analysis application program.

An Example 18 of the numerous embodiments comprises the method of Example 17, where determining the one or more job parameters associated with the data analysis application program processing the dataset comprises determining one or more job parameters for each task of the plurality of tasks.

An Example 19 of the numerous embodiments includes a method comprising receiving an indication of a synchronization request; determining, based on the indication, one or more files stored in a staging location; generating, based on the one or more files, a data transfer filter; causing, based on the data transfer filter, transfer of the one or more files to object storage of a destination computing device; receiving, via a graphical user interface, a request to convert the one or more files from object storage to a distributed file system; receiving, via the graphical user interface, an indication of a storage size of the distributed file system; converting, based on the request and the indication, the one or more files from object storage to the distributed file system associated with the storage size; identifying a data analysis application program associated with the one or more files in the distributed file system; determining, as a program template, one or more job parameters associated with the data analysis application program processing the dataset; and causing, based on the program template, execution of the data analysis application program the one or more files in the distributed file system.

An Example 20 of the numerous embodiments includes a computing system comprising at least one processor; and at least one memory device having processor-executable instructions stored thereon that, in response to execution by the at least one processor, cause the computing system to: receive an indication of a synchronization request; determine, based on the indication, one or more files stored in a staging location; generate, based on the one or more files, a data transfer filter; and cause, based on the data transfer filter, transfer of the one or more files to a destination computing device.

An Example 21 of the numerous embodiments comprises the method of Example 20, where receiving the indication of the synchronization request is based on a synchronization condition.

An Example 22 of the numerous embodiments comprises the method of Example 21, where the synchronization condition is a time interval.

An Example 23 of the numerous embodiments comprises the method of Example 20, where the data transfer filter comprises a list of the one or more files stored in the staging location.

An Example 24 of the numerous embodiments comprises the method of Example 20, where generating, based on the one or more files, the data transfer filter comprises generating a message that invokes a function call to a cloud service, wherein the message passes one or more parameters identifying the one or more files as an argument of the function call.

An Example 25 of the numerous embodiments comprises the method of Example 20, where causing, based on the data transfer filter, transfer of the one or more files to the destination computing device comprises causing a data synchronization application program to scan the staging location and the destination computing device only for the one or more files.

An Example 26 of the numerous embodiments comprises the method of Example 20, the at least one memory device having further processor-executable instructions stored thereon that in response to execution by the at least one processor further cause the computing system to receive, from a data origin device, the one or more files.

An Example 27 of the numerous embodiments comprises the method of Example 26, where the data origin device comprises one or more of a sequencer or an electron microscope.

An Example 28 of the numerous embodiments comprises the method of Example 27, where the one or more files comprise sequence data, particle images, or both.

An Example 29 of the numerous embodiments comprises the method of Example 20, the at least one memory device having further processor-executable instructions stored thereon that in response to execution by the at least one processor further cause the computing system to delete, based on the transfer of the one or more files to the destination computing device, the one or more files from the staging location.

An Example 30 of the numerous embodiments includes a computing system comprising at least one processor; and at least one memory device having processor-executable instructions stored thereon that, in response to execution by the at least one processor, cause the computing system to: receive, via a graphical user interface, a request to convert a dataset from object storage to a distributed file system; receive, via the graphical user interface, an indication of a storage size of the distributed file system; and convert, based on the request and the indication, the dataset from object storage to the distributed file system associated with the storage size.

An Example 31 of the numerous embodiments comprises the computing system of Example 30, the at least one memory device having further processor-executable instructions stored thereon that in response to execution by the at least one processor further cause the computing system to: receive, via the graphical user interface, a request to mount the distributed file system; and mount the distributed file system.

An Example 32 of the numerous embodiments comprises the computing system of Example 30, the at least one memory device having further processor-executable instructions stored thereon that in response to execution by the at least one processor further cause the computing system to: receive, via the graphical user interface, a request to save data in the distributed file system into the object storage; and save the data in the distributed file system into the object storage.

An Example 33 of the numerous embodiments comprises the computing system of Example 30, the at least one memory device having further processor-executable instructions stored thereon that in response to execution by the at least one processor further cause the computing system to: receive, via the graphical user interface, a request to delete the distributed file system; and delete the distributed file system.

An Example 34 of the numerous embodiments includes a computing system comprising at least one processor; and at least one memory device having processor-executable instructions stored thereon that, in response to execution by the at least one processor, cause the computing system to: identify a data analysis application program; identify a dataset associated with the data analysis application program; determine, as a program template, one or more job parameters associated with the data analysis application program processing the dataset; and cause, based on the program template, execution of the data analysis application program on the dataset.

An Example 35 of the numerous embodiments comprises the computing system of Example 34, where the one or more job parameters comprise one or more of: a number of Message Passing Interfaces (MPIs), a number of threads, or a number of compute nodes.

An Example 36 of the numerous embodiments comprises the computing system of Example 34, the at least one memory device having further processor-executable instructions stored thereon that in response to execution by the at least one processor further cause the computing system to determine a plurality of tasks executable by the data analysis application program.

An Example 37 of the numerous embodiments comprises the computing system of Example 36, where determining the one or more job parameters associated with the data analysis application program processing the dataset comprises determining one or more job parameters for each task of the plurality of tasks.

An Example 38 of the numerous embodiments includes an apparatus comprising at least one processor; and at least one memory device having processor-executable instructions stored thereon that, in response to execution by the at least one processor, cause the computing system to: receive an indication of a synchronization request; determine, based on the indication, one or more files stored in a staging location; generate, based on the one or more files, a data transfer filter; and cause, based on the data transfer filter, transfer of the one or more files to a destination computing device.

An Example 39 of the numerous embodiments comprises the apparatus of Example 38, where receiving the indication of the synchronization request is based on a synchronization condition.

An Example 40 of the numerous embodiments comprises the apparatus of Example 39, where the synchronization condition is a time interval.

An Example 41 of the numerous embodiments comprises the apparatus of Example 38, where the data transfer filter comprises a list of the one or more files stored in the staging location.

An Example 42 of the numerous embodiments comprises the apparatus of Example 38, where generating, based on the one or more files, the data transfer filter comprises generating a message that invokes a function call to a cloud service, wherein the message passes one or more parameters identifying the one or more files as an argument of the function call.

An Example 43 of the numerous embodiments comprises the apparatus of Example 38, where causing, based on the data transfer filter, transfer of the one or more files to the destination computing device comprises causing a data synchronization application program to scan the staging location and the destination computing device only for the one or more files.

An Example 44 of the numerous embodiments comprises the apparatus of Example 38, where the at least one memory device having further processor-executable instructions stored thereon that in response to execution by the at least one processor further cause the computing system to receive, from a data origin device, the one or more files.

An Example 45 of the numerous embodiments comprises the apparatus of Example 44, where the data origin device comprises one or more of a sequencer or an electron microscope.

An Example 46 of the numerous embodiments comprises the apparatus of Example 45, where the one or more files comprise sequence data, particle images, or both.

An Example 47 of the numerous embodiments comprises the apparatus of Example 38 and further comprises deleting, based on the transfer of the one or more files to the destination computing device, the one or more files from the staging location.

An Example 48 of the numerous embodiments includes an apparatus comprising at least one processor; and at least one memory device having processor-executable instructions stored thereon that, in response to execution by the at least one processor, cause the computing system to: receive, via a graphical user interface, a request to convert a dataset from object storage to a distributed file system; receive, via the graphical user interface, an indication of a storage size of the distributed file system; and convert, based on the request and the indication, the dataset from object storage to the distributed file system associated with the storage size.

An Example 49 of the numerous embodiments comprises the apparatus of Example 48, the at least one memory device having further processor-executable instructions stored thereon that in response to execution by the at least one processor further cause the computing system to: receive, via the graphical user interface, a request to mount the distributed file system; and mount the distributed file system.

An Example 50 of the numerous embodiments comprises the apparatus of Example 48, the at least one memory device having further processor-executable instructions stored thereon that in response to execution by the at least one processor further cause the computing system to: receive, via the graphical user interface, a request to save data in the distributed file system into the object storage; and save the data in the distributed file system into the object storage.

An Example 51 of the numerous embodiments comprises the apparatus of Example 48, the at least one memory device having further processor-executable instructions stored thereon that in response to execution by the at least one processor further cause the computing system to: receive, via the graphical user interface, a request to delete the distributed file system; and delete the distributed file system.

An Example 52 of the numerous embodiments includes an apparatus comprising at least one processor; and at least one memory device having processor-executable instructions stored thereon that, in response to execution by the at least one processor, cause the computing system to: identify a data analysis application program; identify a dataset associated with the data analysis application program; determine, as a program template, one or more job parameters associated with the data analysis application program processing the dataset; and cause, based on the program template, execution of the data analysis application program on the dataset.

An Example 53 of the numerous embodiments comprises the apparatus of Example 52, where the one or more job parameters comprise one or more of: a number of Message Passing Interfaces (MPIs), a number of threads, or a number of compute nodes.

An Example 54 of the numerous embodiments comprises the apparatus of Example 52, the at least one memory device having further processor-executable instructions stored thereon that in response to execution by the at least one processor further cause the apparatus to determine a plurality of tasks executable by the data analysis application program.

An Example 55 of the numerous embodiments comprises the apparatus of Example 54, where determining the one or more job parameters associated with the data analysis application program processing the dataset comprises determining one or more job parameters for each task of the plurality of tasks.

An Example 56 of the numerous embodiments includes at least one computer-readable non-transitory storage medium having processor-executable instructions stored thereon that, in response to execution, cause a computing system to: receive an indication of a synchronization request; determine, based on the indication, one or more files stored in a staging location; generate, based on the one or more files, a data transfer filter; and cause, based on the data transfer filter, transfer of the one or more files to a destination computing device.

An Example 57 of the numerous embodiments comprises the at least one computer-readable non-transitory storage medium of Example 56, where receiving the indication of the synchronization request is based on a synchronization condition.

An Example 58 of the numerous embodiments comprises the at least one computer-readable non-transitory storage medium of Example 57, where the synchronization condition is a time interval.

An Example 59 of the numerous embodiments comprises the at least one computer-readable non-transitory storage medium of Example 56, where the data transfer filter comprises a list of the one or more files stored in the staging location.

An Example 60 of the numerous embodiments comprises the at least one computer-readable non-transitory storage medium of Example 56, wherein generating, based on the one or more files, the data transfer filter comprises generating a message that invokes a function call to a cloud service, wherein the message passes one or more parameters identifying the one or more files as an argument of the function call.

An Example 61 of the numerous embodiments comprises the at least one computer-readable non-transitory storage medium of Example 56, wherein causing, based on the data transfer filter, transfer of the one or more files to the destination computing device comprises causing a data synchronization application program to scan the staging location and the destination computing device only for the one or more files.

An Example 62 of the numerous embodiments comprises the at least one computer-readable non-transitory storage medium of Example 56, where the processor-executable instructions, in response to further execution, further cause the computing system to receive, from a data origin device, the one or more files.

An Example 63 of the numerous embodiments comprises the at least one computer-readable non-transitory storage medium of Example 62, where the data origin device comprises one or more of a sequencer or an electron microscope.

An Example 64 of the numerous embodiments comprises the at least one computer-readable non-transitory storage medium of Example 63, where the one or more files comprise sequence data, particle images, or both.

An Example 65 of the numerous embodiments comprises the at least one computer-readable non-transitory storage medium of Example 56, where the processor-executable instructions, in response to further execution, further cause the computing system to delete, based on the transfer of the one or more files to the destination computing device, the one or more files from the staging location.

An Example 66 of the numerous embodiments includes at least one computer-readable non-transitory storage medium having processor-executable instructions stored thereon that, in response to execution, cause a computing system to: receive, via a graphical user interface, a request to convert a dataset from object storage to a distributed file system; receive, via the graphical user interface, an indication of a storage size of the distributed file system; and convert, based on the request and the indication, the dataset from object storage to the distributed file system associated with the storage size.

An Example 67 of the numerous embodiments comprises the at least one computer-readable non-transitory storage medium of Example 66, where the processor-executable instructions, in response to further execution, further cause the computing system to: receive, via the graphical user interface, a request to mount the distributed file system; and mount the distributed file system.

An Example 68 of the numerous embodiments comprises the at least one computer-readable non-transitory storage medium of Example 66, where the processor-executable instructions, in response to further execution, further cause the computing system to: receive, via the graphical user interface, a request to save data in the distributed file system into the object storage; and save the data in the distributed file system into the object storage.

An Example 69 of the numerous embodiments comprises the at least one computer-readable non-transitory storage medium of Example 66, where the processor-executable instructions, in response to further execution, further cause the computing system to: receive, via the graphical user interface, a request to delete the distributed file system; and delete the distributed file system.

An Example 70 of the numerous embodiments includes at least one computer-readable non-transitory storage medium having processor-executable instructions stored thereon that, in response to execution, cause a computing system to: identify a data analysis application program; identify a dataset associated with the data analysis application program; determine, as a program template, one or more job parameters associated with the data analysis application program processing the dataset; and cause, based on the program template, execution of the data analysis application program on the dataset.

An Example 71 of the numerous embodiments comprises the at least one computer-readable non-transitory storage medium of Example 70, where the one or more job parameters comprise one or more of: a number of Message Passing Interfaces (MPIs), a number of threads, or a number of compute nodes.

An Example 72 of the numerous embodiments comprises the at least one computer-readable non-transitory storage medium of Example 70, where the processor-executable instructions, in response to further execution, further cause the computing system to determine a plurality of tasks executable by the data analysis application program.

An Example 73 of the numerous embodiments comprises the at least one computer-readable non-transitory storage medium of Example 70, wherein determining the one or more job parameters associated with the data analysis application program processing the dataset comprises determining one or more job parameters for each task of the plurality of tasks.

An Example 74 of the numerous embodiments includes a computing system comprising at least one processor; and at least one memory device having processor-executable instructions stored thereon that, in response to execution by the at least one processor, cause the computing system to: receive an indication of a synchronization request; determine, based on the indication, one or more files stored in a staging location; generate, based on the one or more files, a data transfer filter; cause, based on the data transfer filter, transfer of the one or more files to object storage of a destination computing device; receive, via a graphical user interface, a request to convert the one or more files from object storage to a distributed file system; receive, via the graphical user interface, an indication of a storage size of the distributed file system; convert, based on the request and the indication, the one or more files from object storage to the distributed file system associated with the storage size; identify a data analysis application program associated with the one or more files in the distributed file system; determine, as a program template, one or more job parameters associated with the data analysis application program processing the dataset; and cause, based on the program template, execution of the data analysis application program the one or more files in the distributed file system.

An Example 75 of the numerous embodiments include at least one computer-readable non-transitory storage medium having processor-executable instructions stored thereon that, in response to execution, cause a computing system to: receive an indication of a synchronization request; determine, based on the indication, one or more files stored in a staging location; generate, based on the one or more files, a data transfer filter; cause, based on the data transfer filter, transfer of the one or more files to object storage of a destination computing device; receive, via a graphical user interface, a request to convert the one or more files from object storage to a distributed file system; receive, via the graphical user interface, an indication of a storage size of the distributed file system; convert, based on the request and the indication, the one or more files from object storage to the distributed file system associated with the storage size; identify a data analysis application program associated with the one or more files in the distributed file system; determine, as a program template, one or more job parameters associated with the data analysis application program processing the dataset; and cause, based on the program template, execution of the data analysis application program the one or more files in the distributed file system.

The methods and systems disclosed may be configured for big data collection and real-time analysis. The methods and systems disclosed are configured for ultra-fast end-to-end processing of raw Cryo-EM data and of reconstruction of electron density map, ready for ingestion into model building software.

The methods and systems disclosed optimize reconstruction algorithms and GPU acceleration at one or more stages, from pre-processing through particle picking, 2D particle classification, 3D ab-initio structure determination, high resolution refinements, and heterogeneity analysis.

The methods and systems disclosed enable real-time Cryo-EM data quality assessment and decision making during live data collection, as well as an expedited, streamlined workflow for processing already available data.

The methods and systems disclosed work with specialized and unique tools (e.g., RELION) for therapeutically relevant targets, membrane proteins, continuously flexible structures.

The methods and systems disclosed comprise processing, compute platforms with good bandwidth on the storage for faster process and thereby reducing compute run time, which are costly resources.

The methods and systems disclosed can be configured as a self-service, cloud-based, computational platform that enables scientists to run multiple analytical processes on demand, without IT dependencies or having to determine the compute design. The methods and systems disclosed have broad, flexible applications, regardless of the data type or size, or type of experimentation.

The methods and systems disclosed can determine detailed structures of binding complexes between potential therapeutic antibodies and target proteins.

The methods and systems disclosed may be configured as a platform that enables scientists to scale and process a vast amount of imagery in a timely fashion, with high levels of quality and agility, while containing costs.

The methods and systems disclosed may be configured as an automated, end-to-end processing pipeline by employing AWS Datasync, Apache Airflow (for orchestrating), Luster Filesystem (for high-throughput storage) NextFlow and AWS Parallel Cluster Framework to enable to transport and processing of large amounts of data over time (e.g., 1 TB/hour of raw data) for model development.

The methods and systems disclosed may integrate RELION for real-time Cryo-EM data quality assessment and decision-making during collection of data.

The methods and systems disclosed may extend AWS Parallel Computation framework to accommodate GPU based computing.

The methods and systems disclosed may comprise data management and tiering tooling to enable user management of the life cycle of the data.

The methods and systems disclosed may implement a high performance remote display protocol such as NICE DCV to provide graphics-intensive applications to remote users and stream user interfaces to any client machines, eliminating the need for dedicated workstation.

The methods and systems disclosed may utilize blue-green high-performance computing, a concept that is generally limited to software development, to address the Cryo-EM data quality assessment and decision-making during collection. As a result, job processing is both sped up and scaled up.

Unlike prior data pipelines that had similar workload characteristics, which took three to five days to pre-process data, the methods and systems disclosed are able to speed up the Cryo-EM pipeline to approximately 60 minutes/1 TB data—e.g., ingest raw data, preprocess, classify, reconstruct and refine a 3D map while the sample is still in the microscope.

By using the methods and systems disclosed herein, scientists are able to test and refine picking strategies while data collection is in progress allowing them to fine-tune sample preparation. As a result, time wasted on poor samples can be minimized and scientists can make decisions on the fly, while conducting a microscopy experiment. By leveraging RELION, scientists can assess their preferred orientation by using 2D and 3D information to adjust imaging and processing parameters in real-time. The methods and systems disclosed may also enable interoperability with PLUGIN with NIFTY processing framework to address limited, noisy signal and resolution quality to improve the signal quality (signal-to-noise ratio, for example).

The methods and systems disclosed may be configured as a managed service which provides users instant access to RELION and its associated applications from anywhere.

The methods and systems disclosed represent a scalable cloud-based data processing and computing platform to support a Cryo-EM type large volume data pipeline. The methods and systems disclosed provide key benefits with the cloud-based solution: scalable, nimble, responsive to ever-changing research needs.

The methods and systems disclosed can be applied to other research spaces such as large-scale sequencing, imaging, and other high throughput biology research efforts.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

We claim:

1. A method comprising:
   storing, in a staging location of a source computing device, a) a set of first data files received from a first source and having file names with a first naming convention associated with the first source, and b) a set of second data files received from a second source and having file names with a second naming convention that is associated with the second source, the staging location being a predetermined storage area of the source computing device for holding data files upon receipt and for deleting the data files after successful transfer to a destination computing device;
   receiving an indication of a synchronization request from the destination computing device;
   determining, based on the indication and the first naming convention, a list of available data files for transfer that are stored in the staging location, wherein the list of available data files comprises the set of first data files and not the set of second data files;
   generating, based on the list of the available files, a data transfer filter associated with the first naming convention, wherein the data transfer filter specifies the list of available data files comprising the set of first data files for transfer to the destination computing device and excludes the set of second data files for transfer to the destination computing device;
   transferring, based on the data transfer filter, only the set of first data files from the staging location to the destination computing device;
   receiving, from the destination computing device, an indication of successful transfer of the set of first data files; and
   deleting, based on the indication of successful transfer, the set of first files from the staging location while maintaining the set of second files in the staging location.

2. The method of claim 1, wherein receiving the indication of the synchronization request is based on a synchronization condition.

3. The method of claim 2, wherein the synchronization condition is a time interval.

4. The method of claim 1, wherein the data transfer filter comprises the list of the available files stored in the staging location.

5. The method of claim 1, wherein generating the data transfer filter comprises generating a message that invokes a function call to a cloud service, wherein the message passes one or more parameters identifying the list of available files as an argument of the function call.

6. The method of claim 1, wherein transferring only the set of first data files to the destination computing device comprises causing a data synchronization application program to scan the staging location and the destination computing device only for the set of first files.

7. The method of claim 1, further comprising receiving, from the source computing device, the set of first data files.

8. The method of claim 7, wherein the source computing device comprises one or more of a sequencer or an electron microscope.

9. The method of claim 8, wherein the set of first data files comprise sequence data, particle images, or both.

10. The method of claim 1, wherein the indication of the synchronization request is based on a configurable time interval.

11. The method of claim 1, wherein the destination computing device is associated with a cloud platform, and wherein the transfer of the set of first data files to the destination computing device excludes other computing devices associated with the cloud platform.

12. A method for estimating a three-dimensional molecular structure of a particle via reconstruction based on two-dimensional cryo-electron microscopy images of the particle, the method comprising:
receiving the two-dimensional images of the particle for reconstruction using a data analysis application program;
generating synthetic data and selecting one or more subsets of the synthetic data to simulate an abridged reconstruction;
determining, based on a plurality of compute nodes and the abridged reconstruction, one or more job parameters associated with the data analysis application program, the one or more job parameters characterizing permissible utilization of the plurality of compute nodes by the data analysis application program;
perturbatively generating a plurality of job parameter configurations based on a plurality of pre-existing configurations used in at least one of a prior production reconstruction or the abridged reconstruction;
determining, based on the one or more job parameters and the perturbatively generated plurality of job parameter configurations by iterating through the plurality of job parameter configurations using at least one optimization solver, a program template defining a level of detail to extract from the two-dimensional images of the particle for generating a three-dimensional representation of the particle at a specified resolution;
causing, based on the program template, execution of the data analysis application program on the two-dimensional images of the particle by the plurality of compute nodes to extract the level of detail from the two-dimensional images of the particle; and
causing the three-dimensional representation of the particle to be generated at a desired resolution.

13. The method of claim 12, wherein the one or more job parameters comprise one or more of: a number of Message Passing Interfaces (MPIs), a number of threads, or a number of the plurality of compute nodes.

14. The method of claim 12, further comprising determining a plurality of tasks executable by the data analysis application program, and wherein determining the one or more job parameters associated with the data analysis application program comprises determining one or more job parameters for each task of the plurality of tasks.

15. The method of claim 12, wherein determining the one or more job parameters comprises determining, for each compute node of the plurality of compute nodes, at least one of: a number of graphics processing units or a number of central processing units.

16. The method of claim 12, wherein the at least one optimization solver comprises a steepest descent, a Monte Carlo simulation, or a genetic algorithm.

17. The method of claim 12, wherein a satisfactory performance of causing the three-dimensional representation of the particle to be generated is based on the at least one optimization solver.

* * * * *